United States Patent
Garriga et al.

(10) Patent No.: US 8,482,168 B2
(45) Date of Patent: Jul. 9, 2013

(54) SYSTEMS AND METHODS FOR FLUID COOLING OF ELECTRIC MACHINES

(75) Inventors: Rudolph Garriga, Los Altos, CA (US); Mike Kubic, Mountain View, CA (US)

(73) Assignee: Clean Wave Technologies, Inc., Mountain View, CA (US)

( * ) Notice: Subject to any disclaimer, the term of this patent is extended or adjusted under 35 U.S.C. 154(b) by 133 days.

(21) Appl. No.: 12/958,321

(22) Filed: Dec. 1, 2010

(65) Prior Publication Data
US 2012/0049665 A1 Mar. 1, 2012

Related U.S. Application Data

(63) Continuation-in-part of application No. 12/868,712, filed on Aug. 25, 2010.

(51) Int. Cl.
*H02K 9/00* (2006.01)

(52) U.S. Cl.
USPC .............................. 310/54; 310/59

(58) Field of Classification Search
USPC .......................... 310/52–59, 61–64
See application file for complete search history.

(56) References Cited

U.S. PATENT DOCUMENTS

| | | | |
|---|---|---|---|
| 3,229,130 A | 1/1966 | Drouard | |
| 3,751,699 A * | 8/1973 | Gleichman | 310/90 |
| 4,644,202 A | 2/1987 | Kroy et al. | |
| 4,700,092 A | 10/1987 | Bincoletto | |
| 5,181,837 A | 1/1993 | Niemiec | |
| 5,293,089 A | 3/1994 | Frister | |
| 5,519,269 A | 5/1996 | Lindberg | |
| 5,578,879 A | 11/1996 | Heidelberg et al. | |
| 5,627,420 A * | 5/1997 | Rinker et al. | 310/87 |
| 5,670,838 A | 9/1997 | Everton | |
| 5,744,880 A * | 4/1998 | Kudoh et al. | 310/58 |
| 5,770,903 A * | 6/1998 | Bland et al. | 310/64 |

(Continued)

FOREIGN PATENT DOCUMENTS

| | | |
|---|---|---|
| JP | 9294351 A | 11/1997 |
| JP | 2004-215353 A | 7/2004 |
| KR | 2006-0068667 A | 6/2006 |

OTHER PUBLICATIONS

Palumbo, et al. Power dense induction motor and coordinated inverter drive. Prepared for Motor & Drive Systems 2005, the conference on the latest advancement and economics in electric motor & drive technology. Feb. 8-9, 2005. Hyatt Regency, Tampa, Florida.

(Continued)

*Primary Examiner* — Thanh Lam
(74) *Attorney, Agent, or Firm* — Wilson Sonsini Goodrich & Rosati

(57) ABSTRACT

The invention provides systems and methods for cooling and lubrication of high power density electric machines with an enhanced fluid injection system. Multiple fluid flow passages may be provided within the electric machine, which may include a stator fluid flow pathway between the stator and the machine housing. The stator fluid flow pathway may comprise one or more passages which may allow a fluid to directly contact the stator and the rotor. A method for cooling the electric machine may include directing a fluid to flow through one or more passages between the stator and the housing, which may provide the opportunity to transfer heat from the stator and the rotor to the fluid, thereby cooling the stator and the rotor.

22 Claims, 10 Drawing Sheets

FLUID FLOW
INDICATED BY RED ARROWS

U.S. PATENT DOCUMENTS

| | | | |
|---|---|---|---|
| 5,883,448 A * | 3/1999 | Zimmerman | 310/52 |
| 5,939,808 A | 8/1999 | Adames | |
| 5,994,804 A * | 11/1999 | Grennan et al. | 310/60 R |
| 5,997,261 A * | 12/1999 | Kershaw et al. | 417/366 |
| 6,355,995 B1 | 3/2002 | Jeppesen | |
| 6,750,572 B2 * | 6/2004 | Tornquist et al. | 310/54 |
| 7,352,090 B2 * | 4/2008 | Gustafson et al. | 310/52 |
| 7,394,175 B2 * | 7/2008 | McAuliffe et al. | 310/58 |
| 7,550,882 B2 | 6/2009 | Verhaegen | |
| 7,999,424 B2 | 8/2011 | Nijhuis et al. | |
| 8,154,158 B2 * | 4/2012 | Saban et al. | 310/54 |
| 8,169,110 B2 * | 5/2012 | Swales et al. | 310/54 |
| 2004/0113500 A1 | 6/2004 | Casey et al. | |
| 2005/0206258 A1 | 9/2005 | Gustafson et al. | |
| 2006/0061221 A1 | 3/2006 | McAuliffe et al. | |
| 2006/0066159 A1 | 3/2006 | Enomoto et al. | |
| 2012/0049666 A1 | 3/2012 | Garriga et al. | |
| 2012/0049668 A1 | 3/2012 | Garriga et al. | |
| 2012/0049669 A1 | 3/2012 | Garriga et al. | |

OTHER PUBLICATIONS

Palumbo, et al. Slides presentation. Power dense induction motor and coordinated inverter drive. Prepared for Motor & Drive Systems 2005, the conference on the latest advancement and economics in electric motor & drive technology. Feb. 8-9, 2005. Hyatt Regency, Tampa, Florida.

U.S. Appl. No. 13/314,757, filed Dec. 8, 2011, Garriga et al.

Office action dated May 23, 2012 for U.S. Appl. No. 12/868,712.

Office action dated May 23, 2012 for U.S Appl. No. 13/080,979.

Office action dated May 25, 2012 for U.S. Appl. No. 13/013,110.

* cited by examiner

*Figure 1*
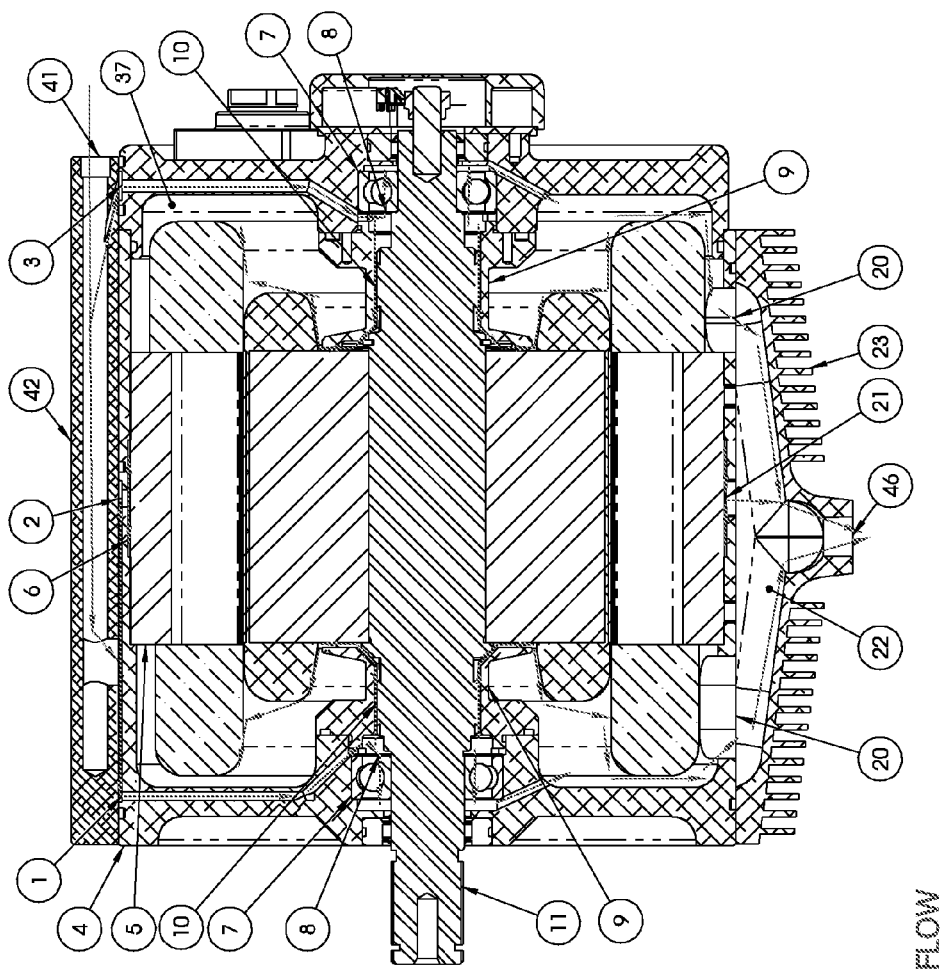
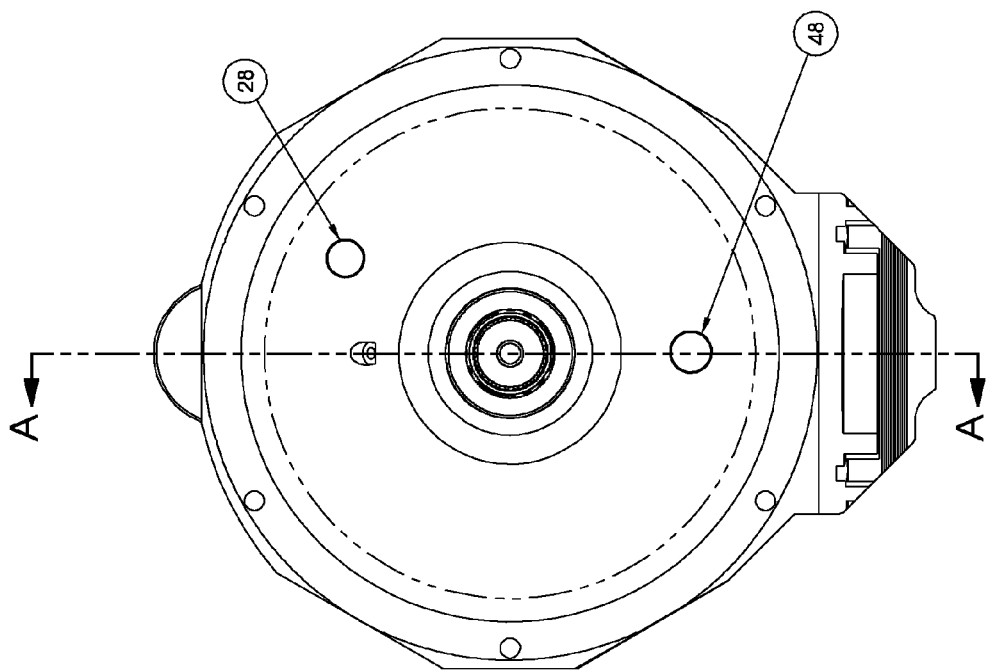
FLUID FLOW
INDICATED BY RED ARROWS

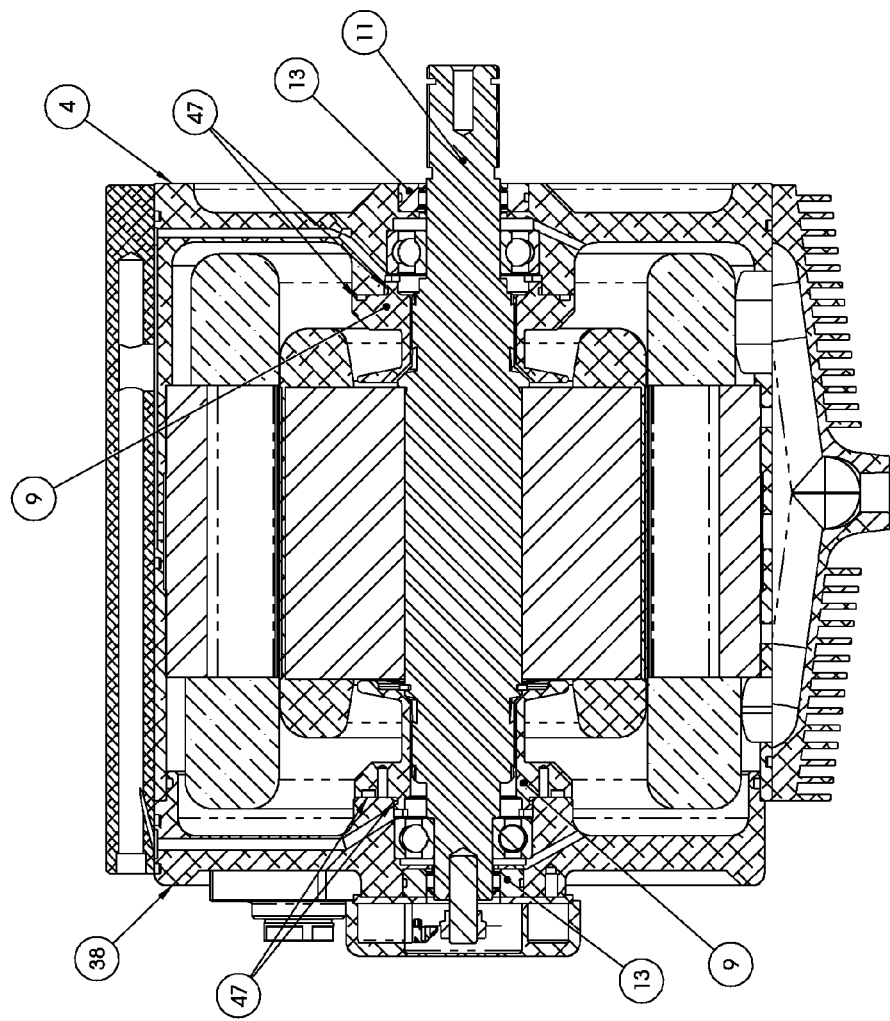
*Figure 6*
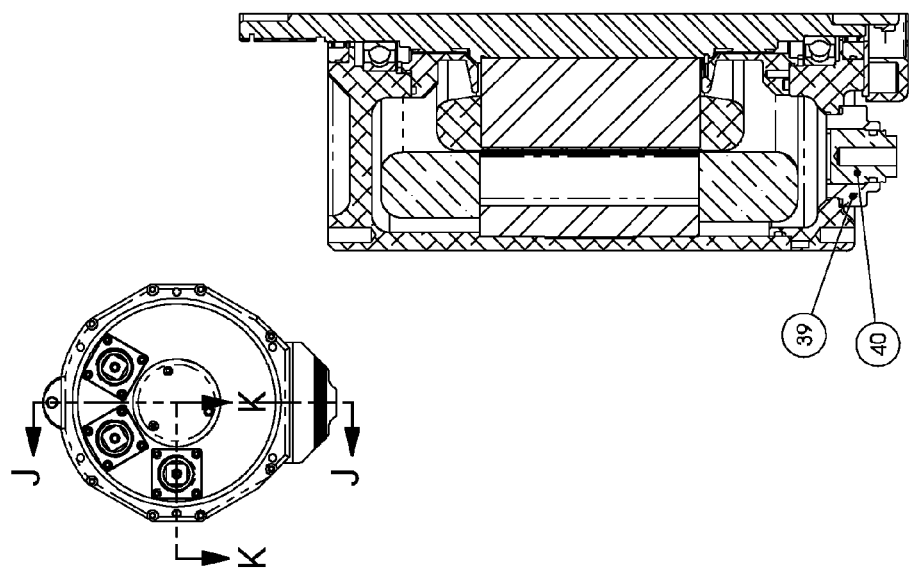

HOMOPOLAR FLUX PATHS INDICATED BY RED ARROWS

SYSTEMS AND METHODS FOR FLUID COOLING OF ELECTRIC MACHINES

CROSS-REFERENCE

This application is a continuation-in-part application of Ser. No. 12/868,712, filed Aug. 25, 2010, which is incorporated herein by reference in its entirety and to which application we claim priority under 35 USC §120.

BACKGROUND OF THE INVENTION

Electric machines have power limitations due to the overheating of internal components. In conventional systems, electric machines are often cooled via exterior cooling. For example, heat sinks may be provided on the external surface of an electric machine to assist with cooling. In some examples, fluid may flow through an outside enclosure of an electric machine or over an external surface of the machine. See, e.g., U.S. Pat. No. 7,550,882; U.S. Pat. No. 5,939,808; U.S. Pat. No. 5,670,838; and U.S. Pat. No. 4,700,092, which are hereby incorporated by reference in their entirety. In some instances, fluid may be provided within an electric machine to assist with cooling, but may be contained within the machine. See, e.g., U.S. Pat. No. 4,644,202; and U.S. Pat. No. 7,352,090, which are hereby incorporated by reference in their entirety.

With improved cooling and lubrication of internal components, it is possible to design an electric machine to produce high power in a much more compact and lower weight package as compared to traditional machine designs. The improved cooling and lubrication facilitates increasing the operating current and speed of the machine, which translates directly into higher torque, higher power, and consequently higher power density.

Thus, a need exists for improved electric machine systems and methods, which may utilize fluid that may flow internally through an electric machine for cooling and lubrication.

SUMMARY OF THE INVENTION

The invention provides systems and methods for cooling and lubrication of high power density electric machines with an enhanced fluid injection system. Various aspects of the invention described herein may be applied to any of the particular applications set forth below or for any other types of electric machines. The invention may be applied as a standalone system or method, or as part of an integrated system, such as in a vehicle. It shall be understood that different aspects of the invention can be appreciated individually, collectively, or in combination with each other.

An aspect of the invention may be directed to an electric machine comprising a rotor fixed to a rotatable shaft and supported by means of one or more bearings, a stator stationary in relation to the rotatable rotor and shaft with a gap between the rotor and the stator, a housing surrounding all or part of the machine, and a fluid distribution manifold with at least one inlet and a plurality of distribution openings leading to a plurality of fluid flow passages within the machine in fluid communication with at least one outlet. In some embodiments, the plurality of fluid flow passages may include a stator fluid flow pathway between the stator and the housing, a rotor fluid flow pathway along the rotatable shaft toward the rotor and stator, and a bearing fluid flow pathway contacting at least one bearing. A stator fluid flow pathway may comprise one or more fluid flow passages which may allow a fluid to directly contact an outside surface of the stator. One or more grooves or other surface features may form the passages between an outside surface of the stator and an inside surface of the housing. In some embodiments, one or more fluid flow passages may be in fluid communication with an exhaust sump which is in fluid communication with at least one outlet. The exhaust sump may be configured such that fluid exiting the fluid flow passages may be collected within the sump prior to exiting the electric machine through the outlet. In some embodiments, the exhaust sump may function as a heat exchanger, thereby providing an opportunity to cool the fluid within the sump.

Another aspect of the invention may provide an electric machine comprising a rotor fixed to a rotatable shaft and supported by means of one or more bearings, a stator stationary in relation to the rotatable rotor and shaft with a gap between the rotor and the stator, and at least one fluid flow passage leading to a fluid injector nozzle, which may direct fluid along the rotatable shaft toward the rotor and stator. In some embodiments, the fluid injector nozzle and/or the rotatable shaft may include features that may incorporate centrifugal pumping to aid the flow and distribution of the fluid. The electric machine may also include a fluid flow passage leading to a junction, wherein the fluid flow pathway may split to contact a bearing and also contact the rotor. Additionally, the electric machine may include a metering device between the bearing and the fluid flow pathway leading to the rotor, wherein the metering device is configured to determine the relative amount of fluid that flows to the bearing and fluid that flows to the rotor. In some embodiments, the metering device may be removable, replaceable and/or adjustable, such that the machine may be operated without a metering device, the metering device may be replaced with different metering devices of different configurations, or the metering device may be adjusted, thereby altering the relative amount of fluid that flows to the bearing and fluid that flows to the rotor. Alternatively, in other embodiments, the fluid flow pathway may not split between the bearing and the rotor, but instead, the fluid may be directed to first contact the bearing, flow through the bearing, and then subsequently flow to contact the rotor.

A method for cooling an electric machine may be provided in accordance with another aspect of the invention. The method may include providing a rotor fixed to a rotatable shaft, providing a stator stationary in relation to the rotatable rotor and shaft with a gap between the rotor and the stator, and providing a housing surrounding all or part of the machine. The method may also include directing a fluid to flow through one or more passages between the stator and the housing, which may provide the opportunity to directly contact the stator and the rotor with the fluid and transfer heat from the stator and the rotor to the fluid, thereby cooling the stator and the rotor.

An additional aspect of the invention may be directed to a system for cooling an electric machine. The system may include an electric machine in fluid communication with a pump, and a heat exchanger in fluid communication with the electric machine and the pump. The electric machine may have a fluid-sealed enclosure with at least one inlet and at least one outlet, one or more fluid flow passages in fluid communication with an inlet and an outlet, and a pressure equalization device that may maintain the pressure within the machine within a predetermined range. In some embodiments, the machine may also include a device to determine the level of fluid within the machine. Additionally, in conjunction with the fluid-sealed enclosure, some embodiments may utilize electrically conductive material to comprise the contact seals around the rotating shaft of an electric machine, which may counteract the negative effects of circulating electric currents generated by homopolar flux paths that may exist in electric machines.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 1 shows an electric machine in accordance with an embodiment of the invention.

FIG. 6 shows a fluid-sealed machine enclosure in accordance with an embodiment of the invention.

DETAILED DESCRIPTION OF THE INVENTION

While preferable embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

I. Fluid Injection System Description

FIG. 1 shows an electric machine in accordance with an embodiment of the invention. In some embodiments of the invention, the electric machine may be a motor, such as a three-phase AC induction motor. Alternatively, the electric machine may be any sort of motor, generator, or any sort of machine that may require some form of electrical and mechanical connection.

The electric machine may also be any machine that may be fluid-cooled or that may have any sort of fluid in its interior. In some embodiments, the machine may have fluid for cooling and/or lubrication. The fluid within the electric machine may be flowing or may be substantially stationary. In some embodiments, the fluid within the electric machine may circulate through the electric machine and may come from a source external to the electric machine. In some embodiments, the machine may be fluid-sealed or partially fluid-sealed.

The electric machine may be utilized in a system. For example, the electric machine may be used in a vehicle, such as an automobile, motorcycle, truck, van, bus, or other type of passenger, commercial, or industrial vehicle, train or other type of railed vehicle, watercraft, aircraft, or any other type of vehicle, or other type of commercial or industrial machinery or equipment. The electric machine that incorporates the fluid injection system in accordance with an embodiment of the invention may be particularly useful for applications in contained, controlled, or harsh environments where no localized cooling of the exterior or interior of the machine is possible, and/or a sealed machine enclosure may be required.

The electric machine may operate at high current levels and high rotational speeds, and may produce much higher power than conventional motors of the same size and weight. The fluid injection system may make this power density possible by allowing for direct cooling of the internal heat sources, as well as lubrication of the high speed bearings.

Figure 1A:
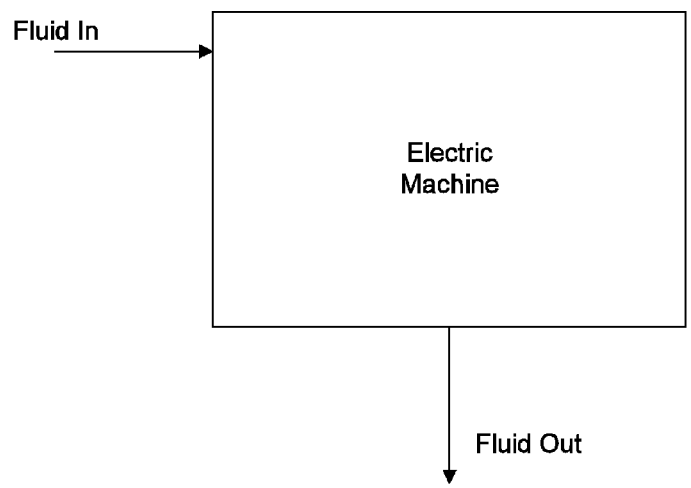
FIG. 1A shows a conceptual illustration of an electric machine with fluid flow in accordance with an embodiment of the invention.

FIG. 1A shows a conceptual illustration of an electric machine with fluid flow in accordance with an embodiment of the invention. A fluid from an external source may enter an electric machine. The fluid may enter the machine via one or more inlets. Fluid from within the electric machine may exit the electric machine. The fluid may exit the machine via one or more outlets. In some embodiments, the fluid may be provided from a fluid source and may exit the machine, such that new fluid is constantly being used to replenish the fluid within the electric machine. In other embodiments, fluid may circulate, such that at least some, or all, of the fluid exiting the electric machine is cycled to enter the same electric machine. Thus, a fluid injection system may be applied to the electric machine.

In some embodiments, new fluid may be continually entering the electric machine and/or old fluid may be continually exiting the electric machine. In other embodiments, the fluid may be supplied intermittently or in batches into the electric machine such that new fluid may be added and/or old fluid removed, and then after a period of time, more new fluid may be added and/or old fluid removed. New fluid may be added at substantially the same rate that old fluid is removed, or new fluid may be added and/or old fluid removed at different and varying rates. New fluid and/or old fluid may be added and removed respectively at desired rates to provide a desired degree of cooling and/or lubrication. In some instances, it may be desired to increase the rate of fluid flow to increase cooling and/or lubrication of the electric machine, or to decrease the rate of fluid flow to decrease cooling and/or lubrication of the electric machine.

In other embodiments, the fluid may be contained within the electric machine and may circulate within the electric machine. In some embodiments, the fluid may be contained within specific parts of the electric machine, while in other parts, the fluid may flow freely between various parts of the electric machine. Any components, features, characteristics, or steps for various fluid-cooled electric machines known in the art may be utilized. See, e.g., U.S. Patent Publication No. 2006/0066159; U.S. Patent Publication No. 2004/0113500; U.S. Pat. No. 5,181,837; U.S. Pat. No. 5,997,261; U.S. Pat. No. 6,355,995; U.S. Pat. No. 5,578,879, which are hereby incorporated by reference in their entirety.

The cooling and/or lubricating fluid may be any fluid known in the art. A fluid may include a liquid or gaseous fluid. In some embodiments, the cooling and/or lubricating fluid may be a gas, such as air; or a liquid, such as water, oil, or a type of liquid dielectric fluid; or a vapor or mist of any such fluids; or any other type of fluid. Any type of coolant and/or lubricant known in the art may be utilized. For instance, a transmission fluid, such as automatic transmission fluid (ATF) may be used. A fluid may be selected according to desired thermal, electrical, chemical, or flow properties. For example, the fluid may have a specific heat falling within a desired range, or may be a fluid that is electrically non-conductive with a resistivity above a desired value, or may be a fluid that is chemically inert or reactive with regard to elements comprising the electric machine, or may be a fluid with a high viscosity or a low viscosity.

In some embodiments, a combination of fluids may be provided within the electric machine. For example, a cooling and/or lubricating fluid may be a liquid provided within a machine, which also contains a gaseous fluid. In some embodiments, the electric machine may be completely flooded by a liquid fluid, may be partially flooded with a liquid fluid, or may have low levels of liquid fluid flowing therein.

The fluid supplied to the electric machine may or may not be pressurized. In some instances, the fluid may be pressurized by a positive pressure source, such as a pump or compressor. The positive pressure source may be external to the electric machine (e.g., on the inlet side of the electric machine), or may be part of the electric machine. In other embodiments, the fluid may be pressurized by a negative pressure source, such as a vacuum. The negative pressure source may be external to the electric machine (e.g., on the outlet side of the electric machine), or may be part of the electric machine. In some instances, the pressure source may be integral to the electric machine and may assist with the flow of fluid within the machine. Any pressure differential may be created that may assist with fluid flow. In other embodiments, other forces, such as gravity or forces resulting from moving parts within the machine, may assist with fluid flow.

All or part of the electric machine may be surrounded by a housing. The machine housing may include any structure or component that surrounds all or part of the electric machine for the purpose of containment, support, and/or protection, or any other similar functions. A structure or component may function as a machine housing, or may comprise part of a machine housing, and may additionally perform other unrelated functions. The housing may surround all or part of a machine assembly, or may surround all or part of any of the individual components of the machine, such as a stator or rotor. One or more individual structures or components surrounding all or part of one or more individual components of the machine may separately function as machine housings, and may also collectively comprise a machine housing. It will be apparent to those skilled in the art that the machine housing, referred to herein, may also be referenced by other terminology without departing from the description provided herein, including machine casing, frame, enclosure, or other similar terms. The machine housing, as referred to herein, may collectively include any and all individual structures and/or components (e.g., a machine endbell) that may perform the function of containment, support, and/or protection, or any other similar functions, for the electric machine or any of the individual components of the electric machine. In some embodiments, all or part of the machine housing may be fluid-sealed.

The electric machine may utilize high power electrical connections. Reliable high power connections may require low-resistance electrical contact with acceptable current density. Typical maximum current densities in copper DC power connections may be on the order of $2.2 \times 10^6$ A/m$^2$. This may typically limit the temperature rise of the connection to under 30° C. in ambient temperatures over 40° C. See e.g., ANSI C37.20C-1974, IEEE standard 27-1974. In copper three-phase AC power connections, maximum peak current densities of $7 \times 10^6$ A/m$^2$ have traditionally been used in electric machines reliably. In some embodiments of the invention, fluid cooling may be introduced to one or more connector surfaces, which may enhance the connection reliability and which may make it possible to exceed the $7 \times 10^6$ A/m$^2$ value.

FIG. 1 shows an embodiment of the invention supplying a fluid into various passages within an electric machine. The fluid may or may not be pressurized. The fluid may enter the machine through an inlet port 41 of a fluid distribution manifold 42 and may be distributed to passages at locations 1, 2, and 3. These passages may direct the fluid to one or more bearings 7 at location 8, to one or more injector nozzles 9 that surround a machine shaft 11 at location 10, and into one or more cavities between a housing 4 and a stator assembly 5 at location 6. Thus, the manifold may distribute fluid to a bearing fluid flow pathway, a rotor fluid flow pathway, and a stator fluid flow pathway respectively.

In some embodiments, the passages at locations 1, 2, and 3 may be oriented near the top of the machine, or in other embodiments, these passages may be oriented near the bottom of the machine or may be oriented anywhere on any side of the machine. In some instances, the passages at locations 1, 2, and 3 may each be oriented on substantially the same side or in similar positions around the machine, and in other instances, the passages may each be individually oriented at any position around the machine. In other embodiments, any number of passages may be located at any position around the machine.

The fluid entering the passages at locations 1, 2, and 3 may be split into multiple paths within the machine. One path may direct some of the fluid to flow through the bearings 7, which may lubricate and cool the bearings (i.e., a bearing fluid flow pathway), and may split to also direct some the fluid to flow through the gap 10 between the injector nozzle 9 and the machine shaft 11 toward the rotor and stator, where the fluid may cool the rotor and stator (i.e., a rotor fluid flow pathway). The fluid that has been split to flow through a bearing fluid flow pathway and a rotor fluid flow pathway may complete each path respectively by flowing through the main internal cavity 37 of the machine housing 4 to an exhaust passage 20 and into an exhaust sump 22. Note that these paths may be repeated at two locations 1, 3 at each end of the machine. Thus, in some embodiments, two or more bearing fluid flow pathways and two or more rotor fluid flow pathways may be provided within the machine.

Another path may direct the fluid to flow around and/or along the stator assembly 5, between the housing 4 and the outer surface of the stator laminations 5 at location 6, where the fluid may cool the stator and may also flow out from the stator to cool the rotor (i.e., a stator fluid flow pathway). Thus, in some embodiments, the same fluid may flow through a stator fluid flow pathway to contact and cool both the stator and the rotor. In some embodiments, the fluid may be directed circumferentially or perimetrically around the stator assembly. The fluid may alternatively or additionally be directed along the length of the stator assembly. In some instances, the fluid may be directed circumferentially or perimetrically around the stator assembly, and/or along the length of the stator assembly, at any desired angle. The internal surface of the housing 4 may have one or more circumferential or perimetrical grooves at location 6, which may form one or more cavities between the outside surface of the stator assembly 5 and the inside surface of the housing 4. The fluid may flow through one or more of these cavities to cool the stator 5 and then, in some embodiments, the fluid may flow through one or more exhaust passages 21 into an exhaust sump 22. Alternatively or additionally, the internal surface of the housing 4 and/or the outside surface of the stator assembly 5 may have one or more grooves or other surface features, which may form one or more passages along the length of the stator assembly, between the outside surface of the stator assembly and the inside surface of the housing. The fluid may flow through one or more of these passages to cool the stator 5 and then, in some embodiments, the fluid may exit one or more of the passages at the edge of the stator laminations. The fluid may then flow to contact and cool the stator end turns and the rotor end rings, and may then flow through the main internal cavity 37 of the machine housing to one or more exhaust passages 20 and into the exhaust sump 22. In some embodiments, one stator fluid flow pathway may be provided within the machine. Alternatively, in other embodiments, two or more stator fluid flow pathways may be provided.

In some embodiments, fluid that has flowed through a stator fluid flow pathway, fluid that has flowed through a rotor fluid flow pathway, and fluid that has flowed through a bearing fluid flow pathway may all collect together in the exhaust sump 22, where the fluid may exit the machine through an outlet port 46. Preferably, the same fluid may be used for all of the fluid flow paths within the machine. In other embodiments, different fluids or combinations thereof may be used for different fluid flow paths.

A. Fluid Distribution Manifold

As previously described, FIG. 1 shows an inlet port 41 and a fluid distribution manifold 42 through which fluid may enter an electric machine in accordance with an embodiment of the invention. In some embodiments, the inlet port may be oriented to be on a side of the electric machine. In other embodiments, the inlet port may be oriented to be from the top of the electric machine, or the bottom of the electric machine. In some instances, the inlet port may be oriented such that the fluid flows horizontally to the fluid distribution manifold. Alternatively, the inlet port may be oriented vertically, or at an angle which may include but is not limited to a 10 degree angle, 15 degree angle, 30 degree angle, 45 degree angle, 60 degree angle, 75 degree angle, or 80 degree angle. In some instances, one, two, three, or more inlet ports may be provided, where each inlet port may have any configuration, location, or orientation, as described. Each inlet port may connect to the same fluid distribution manifold or may alternatively connect to different manifolds which may or may not be in fluid communication with one another. Each inlet port may accept the same fluid or a different type of fluid. An inlet port may be provided on any part of the housing of the electric machine, with or without the use of a manifold. In some embodiments, the manifold may be provided as a part of and/or contained within the housing of the electric machine. In other embodiments, the manifold may be provided as a separate part and attached to the housing of the electric machine. Still in other embodiments, the manifold may be provided such that a portion of the manifold is provided as a separate part attached to the machine and another portion of the manifold is provided as a part of and/or contained within the machine.

Figure 1B:
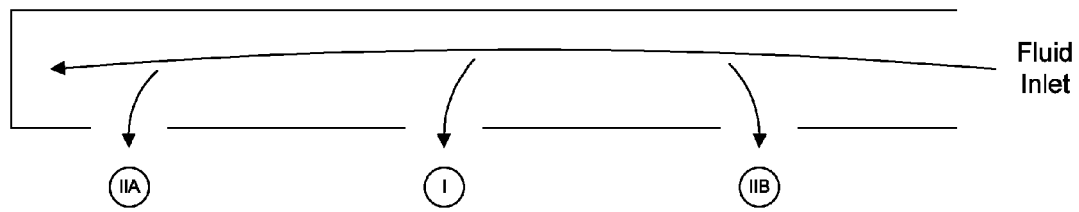
FIG. 1B shows a conceptual illustration of a fluid distribution manifold for an electric machine in accordance with an embodiment of the invention.

FIG. 1B shows a conceptual illustration of a fluid distribution manifold for an electric machine in accordance with an embodiment of the invention. As shown, fluid may enter the manifold from one or more inlets. The fluid distribution manifold may have one or more distribution openings that may lead to one or more fluid flow passages within the machine. In one example, three distribution openings and/or fluid flow passages may be provided I, IIA, IIB. In other embodiments, any number of distribution openings and/or fluid flow passages may be provided, which may include one, two, three, four, five, six, seven, eight, nine, or ten or more distribution openings and/or fluid flow passages.

In some instances, the same number of distribution openings and/or fluid flow passages may be provided. Alternatively, different numbers of distribution openings and/or fluid flow passages may be provided. For example, multiple fluid flow passages may branch off from a single distribution opening or from other fluid flow passages.

The fluid distribution manifold may have any shape or orientation. In some instances, the manifold may have an elongated or flattened shape. For example, the manifold may have a flattened circular, square, rectangular, triangular, hexagonal, octagonal, or any other shape. In some instances, the manifold may be oriented horizontally, such that a smallest dimension extends in a vertical direction. Alternatively, the manifold may be oriented vertically, such that a smallest dimension extends in a horizontal direction. In other embodiments, the manifold may be oriented at an angle.

The distribution openings may be located anywhere along the manifold. For example, the distribution openings may be located on a bottom surface of the manifold. This may enable gravity to assist with causing fluid to flow through the openings. In other embodiments, the distribution openings may be located on a side or top of the manifold.

FIG. 1 shows that, in an embodiment of the invention, fluid may enter the machine through an inlet port 41 of a fluid distribution manifold 42 and may be distributed to passages at locations 1, 2, and 3. The fluid flow passages may be formed of channels, enclosed spaces, non-enclosed spaces, flat spaces, tubes, pipes, or any other shape or configuration. As previously discussed, any number of fluid flow passages may be provided for an electric machine.

Figure 1C:
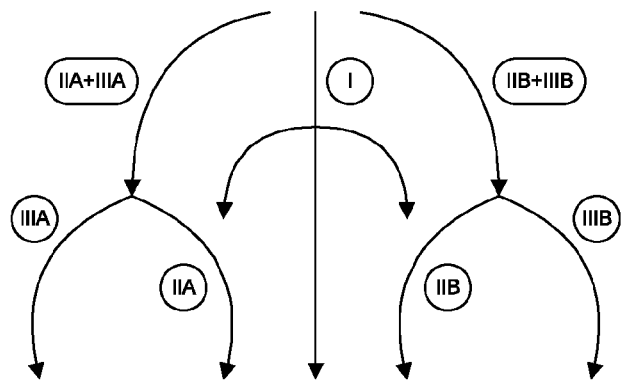
FIG. 1C shows an example diagram of fluid flow paths that may be provided within an electric machine.

FIG. 1C shows an example diagram of fluid flow paths that may provided within an electric machine. A first fluid flow path I may be a stator fluid flow pathway. The stator fluid flow pathway may be provided between a housing of the electric machine and a stator assembly. In one embodiment, one stator fluid flow pathway may be provided. Alternatively, multiple stator fluid flow pathways may be provided within the electric machine. In some embodiments, a stator fluid flow pathway may cause fluid to flow over a substantially curved surface of a substantially cylindrical electric machine, around the axis of rotation of the machine. For example, if a cylindrically shaped machine were provided on its side, such that the axis of rotation of the rotatable rotor and shaft of the machine were parallel to the ground, fluid may flow from above the cylindrical machine and downward, around the curved surface of the cylinder, such that it flows substantially circumferentially around the stator assembly. In other embodiments, the electric machine need not be substantially cylindrical and, as such, the stator fluid flow pathway may alternatively cause fluid to flow around any shaped surface or multiple surfaces, such that fluid may flow around the perimeter of any shape of stator. Alternatively or additionally, in other embodiments, the fluid may flow in any direction or multiple directions around the stator. In some embodiments, a stator fluid flow pathway may cause fluid to flow over the surface of the stator along the length an electric machine, substantially parallel with the axis of rotation of the machine. For example, fluid may flow from a passage near the center of the stator assembly and may flow outward along the length of the stator, such that it flows substantially parallel with the axis of rotation of the rotatable rotor and shaft of the electric machine. In other embodiments, the stator fluid flow pathway may cause fluid to flow at any angle or direction along or around the stator assembly. For example, the fluid may flow at about 5 degrees, about 10 degrees, about 15 degrees, about 20 degrees, about 30 degrees, about 45 degrees, about 60 degrees, about 75 degrees, or about 90 degrees relative to the axis of rotation.

As also shown in FIG. 1C, additional fluid flow paths may be provided within the electric machine. For example, a rotor fluid flow pathway IIA, IIB and a bearing fluid flow pathway IIIA, IIIB may be provided. A rotor fluid flow pathway may be provided, which may direct fluid to contact a rotor and a stator assembly. A bearing fluid flow pathway may be provided, which may cause fluid to contact a bearing assembly. In some embodiments, one, two, or more rotor fluid flow pathways and/or bearing fluid flow pathways may be provided. In some embodiments, two rotor fluid flow pathways and two bearing fluid flow pathways may be provided, including one of each on opposite sides of an electric machine. For example, they may be provided along substantially flat ends of a substantially cylindrical electric machine. Alternatively, any number of rotor fluid flow pathways and bearing fluid flow pathways may be provided around an electric machine. For example, if an electric machine has a circular cross-sectional shape, multiple rotor fluid flow pathways and multiple bearing fluid flow pathways may be provided around various points of the circumference of the electric machine. In some embodiments, a rotor fluid flow pathway and a bearing fluid flow pathway may originate with the same fluid flow passage IIA+IIIA, IIB+IIIB, and may branch off into a separate rotor fluid flow pathway IIA, IIB and a separate bearing fluid flow pathway IIIA, IIIB.

Figure 1D:
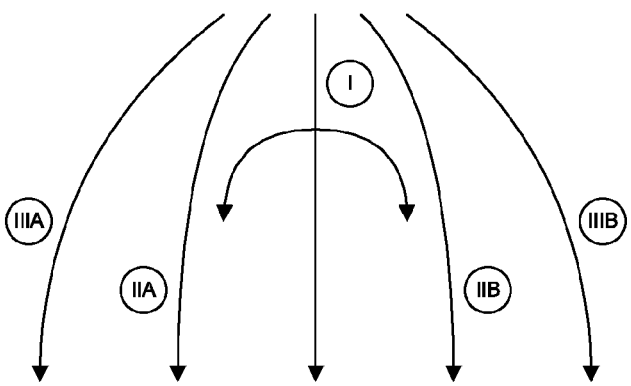
FIG. 1D shows an alternate example diagram of fluid flow paths that may be provided within an electric machine.

In alternate embodiments of the invention, such as shown by the example diagram of fluid flow paths in FIG. 1D, the rotor fluid flow pathway IIA, IIB and the bearing fluid flow pathway IIIA, IIIB need not share the same originating fluid flow passage. Instead, the rotor fluid flow pathway IIA, IIB and the bearing fluid flow pathway IIIA, IIIB may have separate individual distribution openings from the manifold, leading to separate individual fluid flow passages.

Figure 1E:
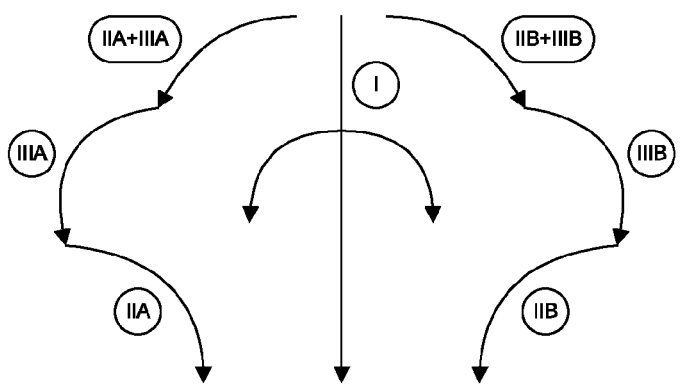
FIG. 1E shows an alternate example diagram of fluid flow paths that may be provided within an electric machine.

In other alternate embodiments, such as shown by the example diagram of fluid flow paths in FIG. 1E, the rotor fluid flow pathway IIA, IIB and the bearing fluid flow pathway IIIA, IIIB may originate with the same fluid flow passage IIA+IIIA, IIB+IIIB, and may not branch off into a separate rotor fluid flow pathway IIA, IIB and a separate bearing fluid flow pathway IIIA, IIIB. Instead, a single fluid flow passage IIA+IIIA, IIB+IIIB may direct fluid to flow in series through a bearing fluid flow pathway IIIA, IIIB and then sequentially through a rotor fluid flow pathway IIA, IIB.

In some embodiments, a stator fluid flow pathway may or may not share any part of a fluid flow passage with a rotor fluid flow pathway and/or a bearing fluid flow pathway. In accordance with one embodiment, an electric machine may have five fluid flow paths: one stator fluid flow pathway, two rotor fluid flow pathways, and two bearing fluid flow pathways.

The electric machine may include one or more fluid distribution manifolds. Each manifold may have a similar configuration or varying configurations. In some instances, each manifold may provide distribution openings to each of the fluid flow pathways. Alternatively, various manifolds may provide distribution openings to different fluid flow pathways.

B. Stator Fluid Flow Pathway

In some embodiments, fluid may flow through a stator fluid flow pathway. FIG. 1 shows a cooling fluid path that may route fluid to flow between an electric machine housing 4 and a stator assembly 5, in accordance with an embodiment of the invention. The fluid may enter one or more fluid flow passages at location 2 and may flow through one or more cavities 6 formed by a circumferential or perimetrical groove on the internal surface of the housing 4. Alternatively or additionally, fluid may flow through one or more passages along the length of the stator formed by grooves or other features on the internal surface of the housing 4 and/or the outside surface of the stator assembly 5. Thus, in some embodiments, fluid may flow through one or more passages around the circumference or perimeter of the stator, and/or flow though one or more passages along the length of the stator, in any direction or multiple directions. In some instances, fluid may exit one or more of the passages along the length of the stator at the edge of the stator laminations, allowing fluid to flow over and/or through the stator end turns and onto the rotor end rings. Thus, the stator fluid flow pathway may comprise one or more fluid flow passages which may allow the fluid to directly contact the outside surface of the stator assembly 5, the stator end turns, and the rotor end rings. It will be apparent to those skilled in the art that the stator laminations, stator end turns, and rotor end rings, referred to herein, may include any other similar structures or components in any type of electric machine without departing from the invention described herein.

Direct contact between the cooling fluid and the stator laminations, stator end turns, and rotor end rings may enhance the thermal transfer from the stator and rotor heat sources to the cooling fluid. This fluid flow path may be enabled by a sealed construction of the machine enclosure. Thus, in some embodiments, a housing for the electric machine may be fluid-sealed, or the portion of the housing in contact with the cooling fluid may be fluid-sealed, however, the machine may not need to be fluid-sealed in some embodiments.

In some embodiments, the fluid entering the fluid flow passage at location 2 may flow through the cavity 6 around the entire circumference or perimeter of the stator assembly 5, and then may exit the cavity through an exhaust passage 21 and into an exhaust sump 22, where the fluid may exit the machine through a fluid outlet port 46. In other embodiments, the fluid entering the fluid flow passage at location 2 may flow through the cavity 6 around part of the circumference or perimeter of the stator assembly 5. Alternatively or additionally, the fluid entering the fluid flow passage at location 2 may flow through one or more passages along the length of the stator assembly 5, and then, in some embodiments, the fluid may exit one or more of the passages at the edge of the stator laminations. The fluid exiting the one or more passages at the edge of the stator laminations may then flow to contact the stator end turns and the rotor end rings, and may then flow through the main internal cavity 37 of the machine housing to an exhaust passage 20 and into the exhaust sump 22, where the fluid may exit the machine through a fluid outlet port 46. In some embodiments, the fluid may contact a stator end turn and/or rotor end ring in one or more locations at one end of the machine or at both ends of the machine.

Figure 7:
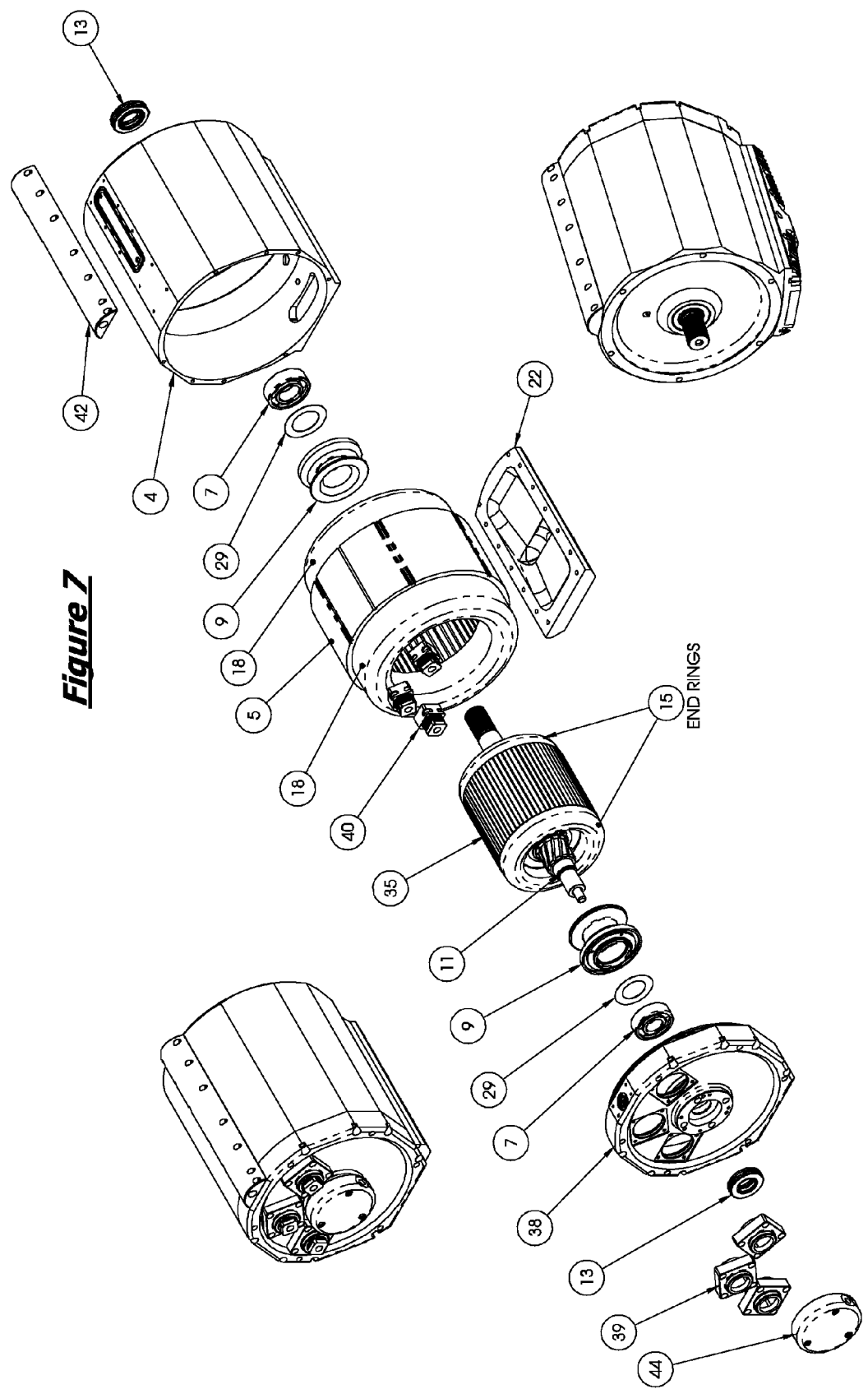
FIG. 7 shows an exploded view of an electric machine in accordance with an embodiment of the invention.

FIG. 7 shows an exploded view of an electric machine in accordance with an embodiment of the invention. A perspective view of a stator assembly 5 is provided. Fluid may flow along the exterior surface of the stator assembly 5, around and/or along the central curved region shown. In other embodiments, the exterior surface of the stator assembly need not be curved and, as such, fluid may flow around and/or along any shape of stator surface or multiple stator surfaces. In some embodiments, the fluid may flow downward around the entire circumference of the stator assembly 5 and, and in some instances, be collected by an exhaust sump 22, which may be located beneath the stator. In other embodiments, the fluid may flow around part of the circumference of the stator assembly 5. In some embodiments, the fluid may flow along the length of the stator assembly 5, and may flow in a direction outward from center of the stator toward one or more edges of the stator. In other embodiments, the fluid may flow along the length of the stator from one edge of the stator toward the center and/or from one edge of stator to the other edge of the stator. In some instances, fluid flowing in a passage toward the edge of the stator may exit the passage at the edge of the stator laminations and flow into the main internal cavity of the machine. After exiting the passage at the edge of the stator laminations, the fluid may additionally flow to contact the stator end turns, and may continue to flow around and/or through the stator end turns to contact the rotor end rings. The fluid may then flow downward through the main internal cavity of the machine housing and, in some instances, be collected by an exhaust sump 22, which may be located beneath the stator and rotor.

In some embodiments, the fluid flow may be confined to a specific region between the stator 5 and a housing 4. In some cases, the fluid flow may be confined within cavities, channels, chambers, zones, or any other fluid confining structure. One or multiple confined fluid flow passages may be provided. In other embodiments, the fluid may flow freely anywhere in the space between the stator and the housing. In some embodiments, the fluid may flow in any direction or multiple directions in any space or combination of spaces between the stator and the housing. The fluid may flow freely over a wide area and/or may be restricted to one or more specified paths. In some embodiments, the fluid may be directed in a path that may cause the fluid to flow in one direction, or multiple directions. Additionally, a fluid flow path may change the direction of the fluid flow at any point and any number of times. In some embodiments, the fluid may flow along a continuous path, or may branch off into different paths. Zero, one, two, or more paths may branch off from zero, one, two, or more points. Fluid may flow along a single defined path and/or may flow along multiple paths in parallel. Multiple fluid flow paths may or may not be parallel to one another.

One or more features may be provided on the inside surface of the housing and/or the outside surface of the stator assembly, which may form one or more passages configured to direct the fluid flow between the stator and the housing. Additionally or alternatively, these one or more features may increase the exposed surface area of the outside surface of the stator and/or the inside surface housing, which may aid in heat transfer between either or both surfaces and the fluid. In some embodiments, the internal surface of the housing may include one or more grooves, channels, ridges, protrusions, fins, bumps, indentations, patterns, textured surfaces, or any other surface features. In some instances, these features may form one or more passages configured to direct the fluid flow around or along the stator surface, between the outside surface of the stator assembly and the inside surface of the housing. Additionally or alternatively, these features may increase the exposed internal surface area of the housing, which may increase the amount of surface area of one or more fluid flow passages in contact with the fluid. This may advantageously allow a greater degree of heat transfer between the fluid and the housing surface. Alternatively, in other embodiments, the internal surface of the housing may be smooth or substantially smooth. In some embodiments, the exterior surface of the stator assembly may include one or more grooves, channels, ridges, protrusions, fins, bumps, indentations, patterns, textured surfaces, or any other surface features. In some instances, these features may form one or more passages configured to direct the fluid flow around or along the stator surface, between the outside surface of the stator assembly and the inside surface of the housing. Additionally or alternatively, these features may increase the exposed surface area of the stator, which may increase the amount of surface area of one or more fluid flow passages in contact with the fluid. This may advantageously allow a greater degree of heat transfer between the stator surface and the fluid. Alternatively, in other embodiments, the stator surface may be smooth or substantially smooth.

In some instances, fluid may flow downward along all or part of the stator fluid flow pathway, and the fluid flow may be driven or assisted by gravity. In other instances, pumps, compressors, or other mechanisms may be utilized to actively force the fluid to flow in a desired manner through all or part the stator fluid flow pathway. Such forced fluid flow may allow the fluid to travel in any direction around and/or along the stator fluid flow pathway, which may include allowing the fluid to travel upwards, downwards, sideways, or at any angle. Thus, the fluid may flow through the stator fluid flow pathway due to one or more of the following: gravity, positive pressure at the start of the fluid flow pathway or at some point along the fluid flow pathway, negative pressure at the end of the fluid flow pathway or at some point along the fluid flow pathway, or one or more moving parts or other mechanisms which may be external to the electric machine or an integral part of the electric machine.

C. Rotor Fluid Flow Pathway

Embodiments for a fluid flow pathway to cool the rotating rotor (or similar dynamic component in other types of electric machines, such as an armature) and stationary stator assembly are described in this section.

Figure 3:
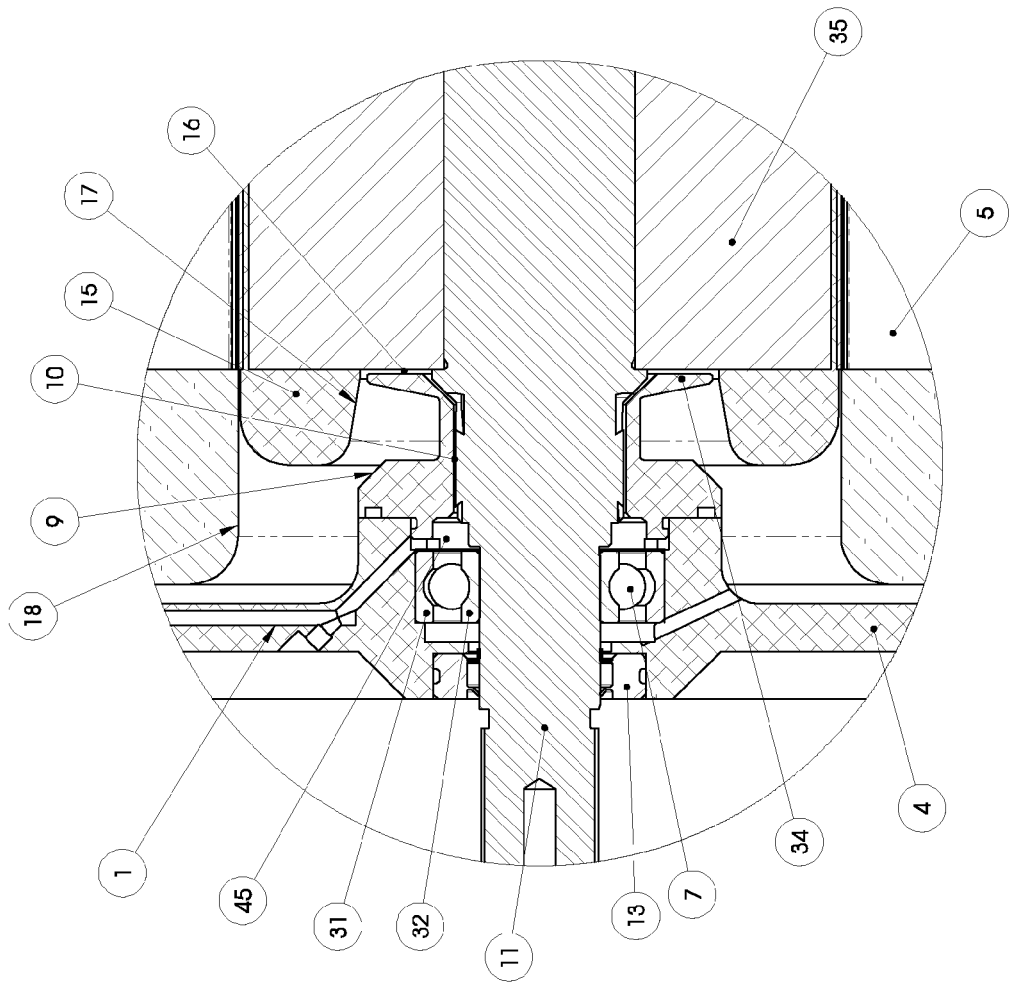
FIG. 3 shows a rotor fluid flow pathway in accordance with an embodiment of the invention.

FIG. 3 provides a magnified detail of a section of an electric machine and shows a rotor fluid flow pathway in accordance with an embodiment of the invention. The fluid may flow from a fluid passage 1 into a cavity 45 near a fluid injector nozzle 9, through a gap 10 between the injector nozzle 9 and a machine shaft 11, and then out through a vertical gap 16 between the injector nozzle 9 and the face of a rotor 35. A larger diameter feature at the end of the injector nozzle 9 adjacent to the face of the rotor 35 may cause the fluid to increase in speed as it exits the gap 16 due to the centrifugal force of the rotating rotor 35. Thus, the part of the injector nozzle that forms the vertical element adjacent to the face of the rotor may also function as a centrifugal pumping disc 34.

Once the fluid is ejected from the gap 16, it may impact the end ring 15 of the rotor at the surface 17 and may cool the end ring 15. The rotor end ring 15 may represent the shorting ring for the rotor bars in an induction machine with a cage style rotor, the end turns in a wound rotor type machine, the end structure of the rotor in a permanent magnet type machine, or any similar structure in any type of electric machine.

The rotor end rings 15, especially on wound or cage type machines, may be made from a high electrically conductive material. In some embodiments, the end rings may also be made of a high thermally conductive material. Some examples of such thermally conductive materials may include, but are not limited to, metals (such as copper, aluminum, brass, silver, gold, iron, steel, lead), diamond, carbon, or any alloy, mixture, or combinations thereof. Cooling the end rings 15 with the fluid flow may cause the heat from the center of the rotor to be removed by thermal conduction to the lower temperature end rings and fluid. In some embodiments, thermally conductive materials or devices (such as heat pipes), which may be either electrically conductive or non-conductive, may be added to the rotor assembly and may be in thermal communication with the rotor structure and/or end rings to improve heat transfer.

Once the fluid is ejected from the end ring 15 by centrifugal force, it may spin off toward the stator end turns 18, where additional may cooling take place. The stator end turns may be the ends of the windings of a stator assembly 5, which may consist of a high electrically and thermally conductive material, and thus may effectively conduct heat from the center of the stator 5 to the fluid. In some embodiments, the windings of the stator assembly may be formed of copper, aluminum, or any other high electrically conductive material. In some instances, the windings of the stator assembly may also be formed of a high thermally conductive material. In some types of electric machines, the stator assembly may contain permanent magnets rather than windings, such as with brushed universal motors. In some embodiments, thermally conductive materials or devices (such as heat pipes), which may be either electrically conductive or non-conductive, may be added to the stator assembly and may be in thermal communication with the stator structure and/or end turns to improve heat transfer.

As shown in FIG. 1, once the fluid impacts the stator end turns 18, it may flow away from the end turns due to the effect of gravity to an exhaust passage 20 of the main internal cavity 37 of the machine housing 4. The machine housing, or the portion of the housing in contact with the cooling fluid, may be fluid-sealed, which may enable the fluid to flow without leaking from the housing, however, the machine may not need to be fluid-sealed in some embodiments. From the exhaust passage 20, it may flow into an exhaust sump 22 and exit the machine through a fluid outlet port 46.

One or more rotor fluid flow pathways may be provided within an electric machine. For example, as shown in FIG. 1C, two similar fluid flow paths IIA+IIIA and IIB+IIIB may be provided. These two similar fluid flow paths may be provided at opposite ends of an electric machine. In other embodiments, there may be any number of rotor fluid flow pathways and they may have any location within the electric machine.

As shown in FIG. 3, the fluid may flow from a fluid flow passage 1 to a cavity 45. The cavity may be a junction at which some of the fluid may branch off into a rotor fluid flow pathway and some of the fluid may branch off into a bearing fluid flow pathway. The cavity may form a junction with any number of configurations, branching off to any number of fluid flow pathways. Alternatively, the cavity need not form a junction, but may direct all of the fluid to flow along a specific pathway.

The fluid may flow from the cavity 45 along a passage between an injector nozzle 9 and a machine shaft 11 and a face of the rotor 35. The fluid may flow in a substantially horizontal direction along a first part of the rotor fluid flow pathway 10 and may flow in a substantially vertical direction along a second part of the rotor fluid flow pathway 16. In other embodiments, these fluid flow passages may have any orientation, whether they be angled (e.g., 5 degrees, 15 degrees, 30 degrees, 45 degrees, 60 degrees, 75 degrees, 85 degrees), or horizontal, or vertical. The fluid flow pathway sections may also be substantially straight, or may be bent, or curved. In some instances, the first part of the fluid flow pathway 10 may transition to the second part of the fluid flow pathway 16 through an intermediate segment that may be angled or curved. In other instances, the first part of the fluid flow pathway may directly transition to the second part of the fluid flow pathway with no intermediate segment. In other embodiments, the first and second parts of the fluid flow pathway may be merged into one passage.

The fluid may or may not require pressure to flow along a fluid flow passage between the injector nozzle and machine shaft. The pressure may be caused by a positive pressure source, such as a pump, a negative pressure source, such as a vacuum, or any other pressure differential generating device. Pressure may be caused by an external source or a source integral to the machine. In some instances, gravity may cause or contribute to the pressure.

In some embodiments, the gap between the injector nozzle 9 and the machine shaft 11 or face of the rotor 35 may vary. For example, in some instances, the gap between the injector nozzle and face of the rotor may be greater than the gap between the injector nozzle and machine shaft, or vice versa. In some instances, the gaps may be on the order of 0.5 to 1.0 mm, however, the size of the gaps may vary accordingly as a function of fluid flow and pressure requirements, the type of fluid, and/or the size of the machine.

The fluid exiting the fluid flow passage 16 may impact the rotor end ring 15. In some embodiments, the rotor end ring may be beveled or may have any other shape. The rotor end ring may be horizontal or may be angled or curved as desired. This will be discussed in greater detail below. As previously described, the fluid may optionally impact the stator end turns 18, and flow away from the end turns. Alternatively, the fluid may impact any other surface provided in the region near the stator and the rotor. The fluid may flow downward due to the effect of gravity to an exhaust passage 20. The fluid may flow down any surface near or integral to the stator and the rotor. In some embodiments, there may be channels or surface features on any of the surfaces that may assist with directing the fluid downwards and/or to a desired location. Alternatively, the surfaces may be substantially smooth.

As shown in FIG. 3, other components that may be located near a rotor fluid flow pathway may include a housing 4 for the electric machine. The cavity 45 may be located near a bearing 7, which may be held in place by a bearing outer race 31 and a bearing inner race 32. This will be discussed in further detail below. Furthermore, a shaft seal 13 may be provided.

D. Bearing Fluid Flow Pathway

A bearing fluid flow pathway may also be provided in accordance with an embodiment of the invention. The fluid pathway to the bearings may allow fluid to flow through the bearings for lubrication and cooling. This may facilitate higher operating speeds, longer continuous operation, higher machine durability and reliability, and longer machine life. The increased operating speeds may be a key enabler to producing higher power and achieving higher power density from an electric machine.

Figure 2A:
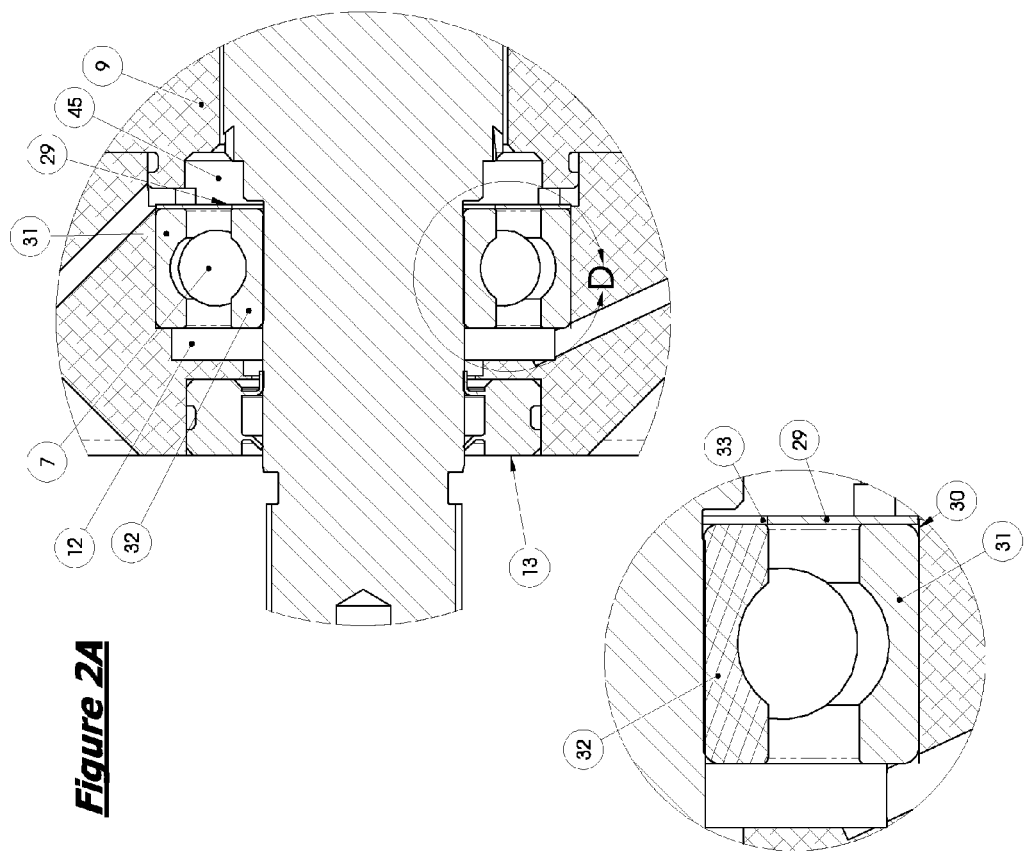
FIG. 2A shows magnified views of a bearing fluid flow pathway and bearing assembly in accordance with an embodiment of the invention.

FIG. 2A provides magnified views of the bearing fluid flow pathway and bearing assembly in accordance with an embodiment of the invention. The fluid may enter into a cavity 45 on one side of a bearing 7, then may flow through a metering device 29, through gaps in the bearing assembly, and into a cavity 12 on the other side of the bearing 7 between the bearing and a shaft seal 13.

The bearing 7 may be supported by an outer race 31 and an inner race 32, which may comprise a bearing assembly. The fluid may flow between the bearing and one or more of the races. Alternatively, some or all of the fluid may flow around the bearing without going between the bearing and the races.

Figure 2:
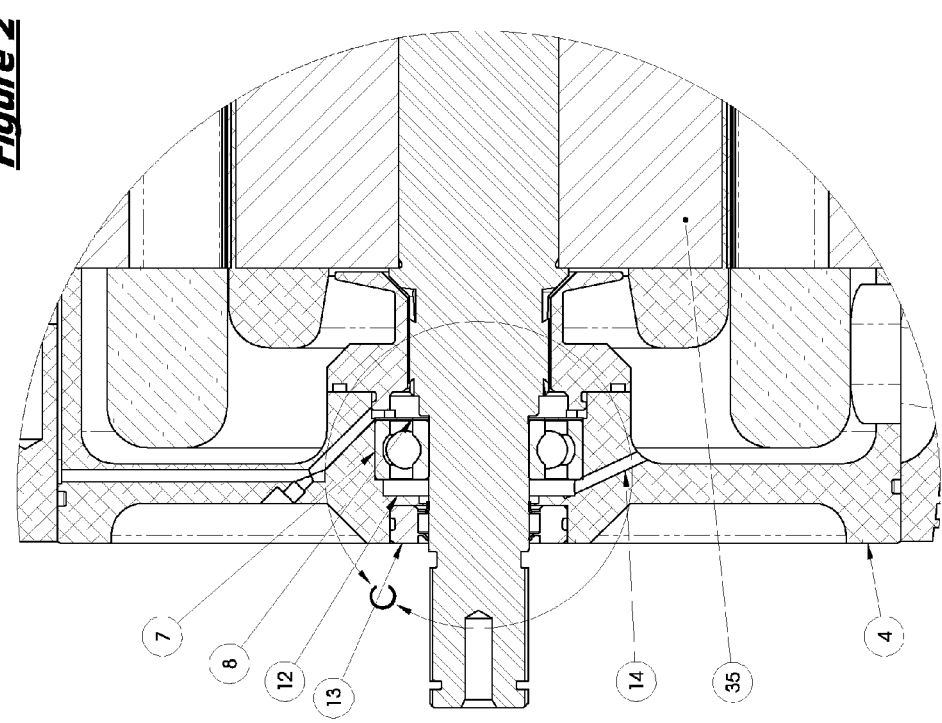
FIG. 2 shows a bearing fluid flow pathway in accordance with an embodiment of the invention.

FIG. 2 illustrates that a drain passage 14 may allow the fluid to exit the cavity 12 and flow out into the main internal cavity of the machine housing 4. FIG. 1 shows how the fluid may flow through the main internal cavity 37 of the machine housing 4 to an exhaust passage 20. From the exhaust passage 20, the fluid may be directed to an exhaust sump 22, where it may exit the machine through a fluid outlet port 46. The machine housing, or the portion of the housing in contact with the cooling fluid, may be fluid-sealed, which may enable to the fluid to flow without leaking from the housing, however, the machine may not need to be fluid-sealed in some embodiments.

Figure 8:
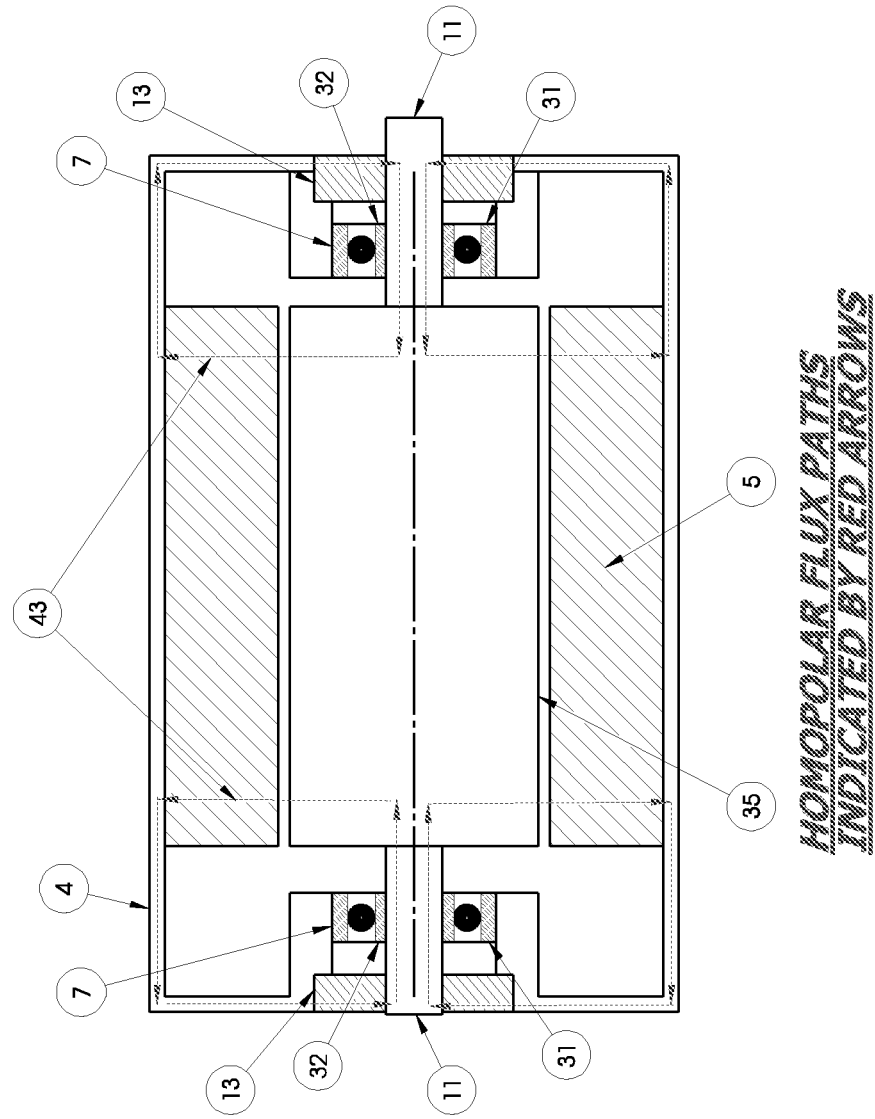
FIG. 8 shows a conceptual illustration of conductive shaft seals of an electric machine, as well as homopolar flux paths.

As shown in FIG. 8, a contact seal 13 may be provided around a shaft 11 of an electric machine and may prevent the fluid from exiting the machine through the interface between the rotating shaft 11 and a machine housing 4. In some embodiments, the shaft seal 13 may be comprised of electrically conductive material, which may complete an electrical path between the rotor 35 and the stator 5. In traditional machines, bearings may need to be electrically insulated from the machine housing and the rotor to prevent circulating electric currents 43 from flowing through the bearings 7, which may cause premature bearing failure due to electrical erosion. By using a conductive seal 13, the currents 43 may flow through the conductive seal 13 instead of the bearings 7, which may serve to prevent premature bearing failure. Shaft seals 13 may be provided at one or both ends of the rotating shaft 11, or at any location where the shaft extends through the machine housing 4. Thus, one or more shaft seals may be electrically conductive, however, the shaft seals may not need to be electrically conductive in some embodiments. The conductive seals will be discussed in greater detail below.

One or more bearing fluid flow pathways may be provided within an electric machine. For example, in some embodiments, two bearing fluid flow pathways may be provided at opposite ends of an electric machine. In some instances, the bearing fluid flow pathways may branch off from one or more fluid passages that may be provided within an electric machine. For example, as shown in FIG. 1C, two similar fluid flow paths IIA+IIIA and IIB+IIIB may be provided. These two similar fluid flow paths may be provided at opposite ends of an electric machine. The bearing fluid flow pathways MA, IIIB may branch off from these two fluid flow paths. In other embodiments, any number of bearing fluid flow pathways may branch off from each fluid flow path, or the bearing fluid flow pathways IIIA, IIIB need not branch off from another fluid flow path, but may be directly connected to a fluid distribution manifold, such as shown in FIG. 1D. In other embodiments, there may be any number of bearing fluid flow pathways and they may have any location within the electric machine.

1. Method of Splitting Fluid Flow for Bearing Lubrication and Cooling

FIG. 2A shows magnified views of a bearing fluid flow pathway in accordance with an embodiment of the invention. In a bearing fluid flow pathway of the fluid injection system, the fluid may be directed into a cavity 45, where the fluid may be split between a bearing 7 and a fluid injector nozzle 9. Thus, the cavity 45 may form a junction where the fluid may split in two or more directions. In some embodiments, the fluid flow may split into a bearing fluid flow pathway, which may direct some of the fluid through a bearing 7 to lubricate and cool the bearing, and into a rotor fluid flow pathway, which may also direct some of the fluid through a gap 10 between an injector nozzle 9 and a machine shaft 11 toward the rotor and stator.

In some embodiments, the injector nozzle 9 may or may not require fluid pressure for the fluid injection system to work properly, but it may be desired to regulate or meter the relative amount of fluid flow to the bearing 7, versus the amount of fluid flow through the pathway leading to the rotor and stator. This may be accomplished by the use of a fluid flow metering device 29, captured between the injector nozzle 9 and the bearing assembly, which may comprise one or more bearings 7, a bearing inner race 32, and a bearing outer race 31. The bearing assembly 7, 31, 32 and metering device 29 may be secured by the injector nozzle 9, which may serve both to capture the metering device 29 and secure it in place, as well as clamp the bearing assembly 7, 31, 32 in place. Clamping the bearing assembly in place may keep the bearing assembly from shifting or spinning as the machine housing 4 temperature increases, due to differences in thermal expansion properties between the bearing assembly materials and the housing material.

Any of the components mentioned above may be formed of any materials of desired properties. For example, the bearings may be steel bearings that may be relatively less costly to manufacture than some other types of bearings. While steel may be preferable for rolling element bearings, other metals, plastics, glass, and/or ceramics, or any combination thereof may also be used. The housing may be formed of, but not limited to, aluminum, steel, iron, copper, brass, silver, gold, lead or any other metal, or other materials such as plastics, glass, ceramics, or any alloy, mixture, or combination thereof.

The use of a high thermal conductivity material for the housing 4, such as aluminum, may create a thermal expansion mismatch with regard to the material of the bearing 7, the bearing inner race 32, and/or the bearing outer race 31, which, for example, may be formed of steel. The housing bore 30, in which the bearing assembly 7, 31, 32 is seated, may expand in size faster with increased temperature than the bearing assembly, which may allow the bearing assembly 7, 31, 32 to shift or spin in the housing 4. Because of this effect, it may be desired to clamp the bearing assembly 7, 31, 32 in place. This may be accomplished with the injector nozzle 9, which, in addition to its fluid distribution function, may also serve as a bearing clamp, eliminating the need for extra hardware to perform each function.

To control the fluid flow through the bearing 7, the metering device 29 may be clamped against a bearing outer race 31. In one embodiment, a small gap 33 between the metering device 29 and the bearing inner race 32 may be used to manage the rate of fluid flow through the bearing 7, so as to maintain fluid pressure into the injector nozzle 9, and yet provide enough fluid to lubricate and cool the bearing 7.

In some embodiments, the metering device 29 may have holes, channels, or passages, or be constructed of perforated, porous, permeable, or semi-permeable material, which may enable fluid to flow from one side of the metering device to the other through the metering device. In such situations, a gap 33 may or may not be provided for the metering device 29. Alternatively, the metering device 29 may be solid and may not have holes, channels, or passages within. The metering device 29 may be formed of a material that may be impermeable, semi-permeable, or permeable with respect to the fluid that may flow therethrough. In some embodiments, the metering device may be a plate, or may have any other shape or configuration.

In some embodiments, the metering device 29 may be removable, replaceable, and/or adjustable, such that the machine may be operated without a metering device, the metering device may be replaced with different metering devices of different sizes and/or configurations, or the metering device may be adjusted, thereby altering the relative amount of fluid that flows to the bearing 7 and fluid that flows to the injector nozzle 9. Thus, the use of the metering device 29 may allow for interchangeable devices, each with a different size or configuration of fluid passage to match the desired fluid flow rate or accommodate the use of different types of fluids.

For example, small gaps 33 or holes may be used for gas fluids, and larger gaps 33 or holes may be used for higher viscosity liquids. The size and/or configuration of the metering device may also be adjusted to determine the relative amount of fluid that flows to the bearing 7 and fluid that flows to the injector nozzle 9. For example, if it is desired that relatively more of the fluid flow into the bearing fluid flow pathway, the size or configuration of the metering device may be adjusted such that the size of the gap 33 or the holes may be increased, which may allow more fluid to flow through the metering device into the bearing fluid flow pathway.

In some embodiments, a metering device 29 may be adjustable. For example, the size of the metering device may be adjustable, which may vary the size of a gap 33. Alternatively, the number or sizes of holes, channels, or paths through the metering device may be variable. One or more valves may be provided. Other adjustable features that may accommodate different fluids and/or flow rates may be provided.

The metering device 29 may have a substantially vertical configuration. In other embodiments, the metering device may be angled. The metering device may be angled at a desired amount in order to allow a desired rate or proportion of fluid to flow into the bearing fluid flow pathway.

The use of a metering device 29 may advantageously allow the same electric machine to be used with different types of fluids. The metering devices may be interchanged and/or adjustable features may be controlled to accommodate different fluids, but other changes may not need to be made to the electric machine. This may contrast with traditional electric machine designs, which may require entirely different configurations, and/or may need to be replaced entirely, to accommodate different types of fluids.

2. Alternate Method of Fluid Flow for Bearing Lubrication/Cooling and Rotor Cooling In another embodiment of the invention, an alternate method of fluid flow for a bearing fluid flow pathway and a rotor fluid flow pathway may be provided, as compared to the method previously described. As shown in FIG. 1E, the rotor fluid flow pathway IIA, IIB and bearing fluid flow pathway IIIA, IIIB may originate with the same fluid flow passage IIA+IIIA, IIB+IIIB, and may not branch off into a separate rotor fluid flow pathway IIA, IIB and a separate bearing fluid flow pathway IIIA, IIIB. Instead, a single fluid flow passage IIA+IIIA, IIB+IIIB may direct fluid to flow in series through a bearing fluid flow pathway IIIA, IIIB and then sequentially through a rotor fluid flow pathway IIA, IIB. This method presents a unique fluid flow path that may allow fluid to flow through one or more bearings for lubrication and cooling, and then may subsequently allow fluid to flow through a rotor fluid flow pathway for cooling of a rotor and a stator assembly. This method may be particularly applicable when larger bearings are used, although it may optionally be used with bearings of any size.

FIG. 2 shows an example of a bearing fluid flow pathway in accordance with one embodiment of the invention. In an alternate embodiment, fluid may be injected first into a cavity located at 12, rather than into a cavity located at 45, as shown in FIG. 2A. Fluid may first flow into a cavity located at 12 via one or more fluid flow passages that may be connected to a fluid distribution manifold. The fluid flow passage may or may not also branch off into a rotor fluid flow pathway prior to reaching the cavity 12. In preferable embodiments, the fluid flow passage does not branch off separately to a rotor fluid flow pathway. A drain passage 14 and/or metering device 29 may or may not be eliminated in this method. If the drain passage is eliminated, the fluid from the bearing flow pathway may all be directed through the bearing 7.

This method of fluid flow may be similar to the method described previously, with the exception that a fluid passage 1 may enter the cavity located at 12 on the same side of the bearing as the shaft seal, and the drain passage 14 may be eliminated as well. Fluid may flow from the cavity located at 12, through a bearing 7, and into the cavity located at 45. The fluid may then continue through a gap 10 between an injector nozzle 9 and a machine shaft 11, and then flow out through a vertical gap 16 between the injector nozzle 9 and the face of a rotor 35, as shown in FIG. 3, to contact a rotor end ring 15 and stator end turns 18 as described previously. Thus, with this alternate method of fluid flow for bearing lubrication/cooling and rotor cooling, the fluid flow path may not split between the bearing 7 and injector nozzle 9, but instead, the fluid may flow in series directly through the bearing 7 and then into the gap 10 between the injector nozzle 9 and machine shaft 11.

In this alternate method, fluid may flow through a bearing fluid flow pathway, and then sequentially flow through a rotor fluid flow pathway. This may enable the bearing and the rotor to be cooled and/or lubricated in sequence, rather than in parallel as provided in the previous method. Thus, a particular fluid may first contact one or more bearings, flow through the bearing or bearings, and then flow through a rotor fluid flow pathway in any of the embodiments or variations described. This may be contrasted with methods where fluid flow paths may branch off, such that fluid may flow through a bearing fluid flow pathway and a rotor fluid flow pathways in parallel, with separate fluid contacting the bearing and the rotor.

II. Centrifugal Pumping of Fluid from Injector Nozzle

FIG. 3 shows a rotor fluid flow pathway in accordance with an embodiment of the invention. A centrifugal pumping disk 34 may be provided adjacent to a surface of a rotor 35. The centrifugal pumping disk may be integrally formed from an injector nozzle 9. Alternatively, the centrifugal pumping disk may be separate from the injector nozzle. The pumping disk and the rotor may form a gap 16 which may be part of the rotor fluid flow pathway.

For the rotor fluid flow pathway of the fluid injection system, the use of a larger diameter parallel centrifugal pumping disk 34 on the output of the injector nozzle 9, which may be stationary with respect to the rotating rotor 35, may cause the fluid to flow in a radial direction through the gap 16 between the disk 34 and the face of the rotor 35 and may increase fluid velocity. As the fluid velocity increases, the pressure of the fluid may drop, and the disk 34 may act as a centrifugal pump to aid the flow and distribution of the fluid. This method may advantageously incorporate centrifugal pumping as an integral part of the machine design, which may increase or enhance the fluid flow within the machine, and/or may eliminate or reduce the requirement for external pumping of fluid in some embodiments of the invention.

From Bernoulli's equation:

$$P + \tfrac{1}{2}\rho V^2 + \rho g h = K,$$

where
P is pressure,
ρ is density,
V is fluid velocity,
g is gravity,
h is height change,
K is a constant.

Assuming constant temperature, the fluid velocity, V, increases due to the rotating action of the rotor, thus causing the fluid pressure, P, to decrease. This pressure drop may allow the injector nozzle to function as a centrifugal pump.

Figure 5:
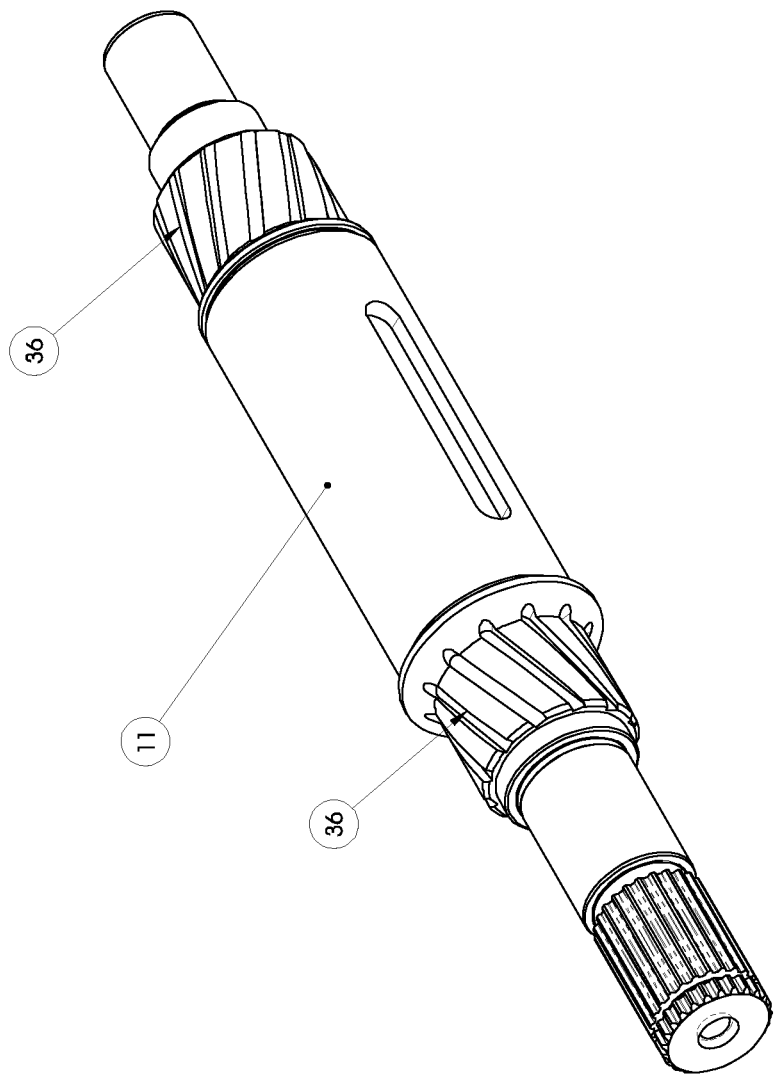
FIG. 5 shows a machine shaft in accordance with an embodiment of the invention.

Increasing the size of the centrifugal pumping disk 34 may increase the pumping effect. The use of a substantially smooth surface on the disk 34 may reduce the drag losses on the machine. If greater pumping effects are required, the addition of vanes on the surface of the rotating centrifugal pumping disk 34 may increase the pumping pressure due to additional changes in fluid velocity, but may require more power from the machine to operate. Furthermore, as illustrated in FIG. 5, additional centrifugal pumping force may be achieved by providing features, such as vanes 36, on the machine shaft 11. These vanes may be in the region of a gap 10 between the shaft 11 and the fluid injector nozzle 9, as illustrated in FIG. 3. These vanes 36 may act to pump the fluid through the gap 10. The vanes may be angled to assist with directing the fluid in a desired direction. For example, the vanes may be angled such that fluid flows toward the center of the electric machine (i.e., through a first gap 10 and then transitioning to a second gap 16). Alternatively, grooves, ridges, channels, or any other surface features maybe provided to assist with directing the fluid and affecting the pumping pressure.

The centrifugal pumping disk 34 may be formed of any material that may provide the desired mechanical and/or surface properties to assist with the pumping effect. As previously mentioned, it may be desirable for the surface of the centrifugal pumping disk to be substantially smooth. In some other embodiments, the centrifugal pumping disk may have a textured surface, or other surface features such as channels, ridges, indentations, or vanes that may affect the fluid flow through the gap 16 adjacent to the disk. The disk surface adjacent to the face of the rotor 35 may be oriented vertically, or may have some angle, that may direct the fluid in a desired manner.

Because additional fluid flow may not be required at all times, this method of enhancing fluid flow by means of centrifugal pumping may automatically enable increasing the fluid flow when additional cooling is needed most. As the rotational speed of the machine increases, the power of the machine may also increase, and thus, the heat loss from the machine may also increase. The integrated centrifugal pumping method may proportionally increase the rate of fluid flow with respect to the rotational speed of the machine, which may simultaneously increase the heat transfer rate of the cooling system at times of high power operation. Thus, as the need for heat transfer within the machine increases, increased fluid flow and heat transfer may be provided by means of the centrifugal pumping method.

III. Method of Enhancing Fluid Flow and Heat Transfer on Rotor End Ring

In traditional machines, rotor end rings of electric machines are often made with fins to circulate air in machine housings and increase convection heat transfer.

In a fluid injection cooled machine, the heat transfer mechanism may be by means of conduction and/or convection to the injected fluid. As shown in FIG. 3, the injected fluid may exit a gap 16, spray onto the internal diameter of a rotor end ring 15, and flow over and around the end ring to spray onto stator end turns 18.

The rotor end ring 15 may be provided at a desired distance from the opening of the gap 16 between a fluid injector nozzle 9 (and/or centrifugal pumping disk 34) and the face of a rotor 35. For example, the distance between the opening of the gap 16 and the rotor end ring 15 may be adjusted accordingly to provide a desired amount of fluid flow and/or to control the direction of fluid flow. Additionally, in some embodiments, the fluid injector nozzle 9 and/or centrifugal pumping disk 34 may be configured and/or include features such that the fluid exiting the gap 16 is directed in a desired manner toward the rotor end ring 15.

To enhance the heat transfer and fluid flow on the rotor end ring, the rotor end ring may include one or more features that may increase the surface area exposed to the fluid that has exited the gap 16 and/or that may aid in directing the fluid to flow over the surface of the rotor and then toward the stator by centrifugal force. In some embodiments, the rotor end ring surface may be substantially flat or may include a beveled feature 17. The addition of a beveled feature 17 on the internal diameter of the end ring 15 may increase the surface area exposed to the cooling fluid. In some embodiments, the rotor end ring surface may be substantially smooth or may include surface features, such as channels, ridges, protrusions, vanes, indentations, or any other feature, which may increase the surface area of the rotor end ring that may be exposed to the fluid and/or which may enhance the flow of the fluid over and around the end rings. The features may be aligned in a manner that may encourage fluid flow along the length of the rotor end ring 15 to spray the fluid toward the stator end turns 18.

A beveled feature 17 may also increase the rate of fluid flow due to the direction of the centrifugal force, and therefore, may increase the rate of heat transfer from the rotor end ring 15 to the fluid. The addition of the beveled feature 17 on the internal diameter of the end ring may enhance the fluid flow because the centrifugal force will have an axial velocity component. This feature may reduce the fluid film thickness and may increase fluid velocity across the surface of the end ring, thus increasing the heat transfer rate, while minimizing wind losses in the machine.

The desired degree of beveling may be at any angle N where N is a number between 0 and 90 relative to horizontal. For example, the beveled feature may be about 1 degree, 2 degrees, 3 degrees, 5 degrees, 7 degrees, 10 degrees, 12 degrees, 15 degrees, 20 degrees, 25 degrees, 30 degrees, 35 degrees, 40 degrees, 45 degrees, 50 degrees, 60 degrees, 70 degrees or about 80 degrees or more or less.

In some instances, the beveled surface may be substantially smooth. Alternatively, any number of additional surface features may be incorporated that may further increase the surface area exposed to the fluid, that may further enhance the fluid flow rate over the surface of the rotor, and/or that may aid in directing the fluid flow over the rotor and ring toward the stator.

IV. Sealing Machine Shaft with Electrically Conductive Seals

FIG. 8 shows an illustration of conductive shaft seals of an electric machine, as well as homopolar flux paths that may exist in electric machines driven by means of an AC inverter. These flux paths may generate circulating electric currents 43 between a rotor 35, a stator 5, and a housing 4. If the rotor is not electrically insulated from the stator and/or the housing, these currents may flow through the machine bearings 7, particularly if the bearings are metallic, or otherwise electrically conductive.

In some embodiments, the bearings may be metallic rolling element bearings, such as ball or roller bearings, and the currents 43 may flow through the rolling contacts of the bearings. These rolling contacts may be small surface area contacts, such as point or line contacts, where high current densities may occur and electrical arcing may create pits on the bearing races 31, 32.

Rolling contacts between the bearings and the bearing races may be intermittent contacts as the balls or rollers may be rolling at high speeds. These intermittent contacts, combined with the high current density, may cause arcing to occur many times per revolution of the bearing, and may ultimately cause destructive pitting on the surfaces of the bearing assembly materials. The pitting on the surfaces of the bearing assembly may lead to bearing failures and may substantially shorten the life of the machine bearings.

Traditional solutions to this problem include using special electrically insulated bearings, such as bearings with ceramic rolling elements, or electrical insulators on the machine shaft 11, inner bearing race 32, or outer bearing race 31. These solutions may be expensive and/or unreliable.

In accordance with an embodiment of the invention, the machine with an internal fluid injection system may require a sealing method on the machine shaft 11 to prevent leakage of fluid from the machine. This may be achieved by using a contact seal 13, which may prevent fluid from exiting the machine at the interface between the machine shaft 11 and the housing 14. In some embodiments, the contact seal may contact the housing and/or the machine shaft. If the contact seal 13 is made from an electrically conductive material, the seal may also provide an electrical connection between the machine shaft 11 and the housing 4.

This novel method of sealing may provide an alternate path 43 for the current to flow through the conductive shaft seals 13, and thus, may present a solution to the circulating current problem. The seal 13 may have a much larger surface area contact than the bearings, and therefore, the circulating current 43 may mostly flow through the seal 13. Thus, when the bearings make intermittent contact with the bearing races, electrical arcing may not occur between the bearings and the races, as the seal may provide an alternate path for the circulating current 43.

In some embodiments, the material for the contact seal may be selected such that it has a high electrical conductivity. In some embodiments, the contact seal may be formed of a material with a greater electrical conductivity than the material selected for the bearing and/or the bearing races. For example, if a contact seal 13 has a first electrical conductivity of E1, and a bearing 7 has a second electrical conductivity of E2, then E1 may be greater than E2. Thus, the circulating electric current 43 may preferably flow through the contact seal 13 rather than through the bearing 7. However, in some embodiments, E1 may not need to be greater than E2 for the circulating electric current to preferably flow through the contact seal rather than through the bearing, as the seal may have much greater surface area contact relative to the surface area contact of the bearing, which may be substantially a point or line contact. The larger surface area contact of the seal may cause the effective electrical conductivity of the seal to be greater than the effective electrical conductivity of the bearing and/or bearing races when operating in an electric machine.

Some examples of materials that may be used for the contact seal may include, but are not limited to, aluminum, copper, brass, nickel, titanium, graphite, carbon, silver, gold, iron, steel, or any alloy, mixture, or combinations thereof. The contact seal may be plated, clad, or include layers or components of various materials, including elemental metals. The contact seal may be formed from any plastic or elastomer (such as polytetrafluoroethylene) and may be filled, or partially filled, with conductive material. The contact seal may be formed of, or may include, an elemental metal, any other conductive material, or any combinations thereof.

By using a conductive contact seal 13, circulating electric current 43 may be prevented or reduced from flowing across the bearing 7 and may allow for the use of more cost-effective conventional metallic bearings, without the issue of premature bearing failure due to pitting occurring on the bearing races 31, 32 due to electrical arcing. Thus, by providing a seal that may be used to prevent fluid leakage from the housing, and by using a conductive material for that seal, conventional cost-effective metallic bearings may be used reliably in an electric machine.

V. Exhaust Sump as Heat Exchanger

Figure 4:
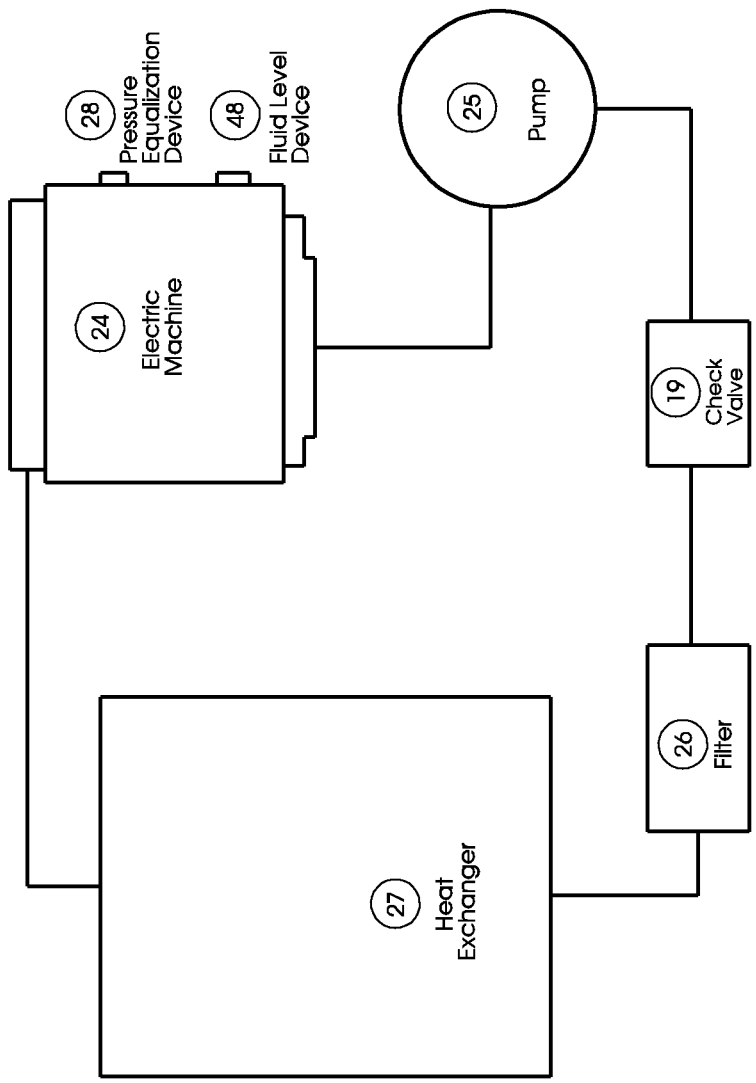
FIG. 4 shows a conceptual illustration of a system that may be used to circulate fluid through an electric machine.

FIG. 1 provides an example of an electric machine in accordance with an embodiment of the invention. The electric machine may include a fluid injection system, and may provide for various fluid flow paths within the machine. The fluid may be used for cooling and/or lubrication of the electric machine. The fluid temperature may be increased through heat transfer from the heat sources of the machine, after which the fluid may collect at the base of the machine, where it may be pumped out to an external remote heat exchanger, such as shown in FIG. 4.

As shown in FIG. 1, the fluid within the electric machine may flow downwards and be collected in an exhaust sump 22. Because there may be a volume of fluid collected in the exhaust sump 22, and also may be some delay in time before the fluid exits the machine, there may be an opportunity to remove heat from the fluid at this location. Thus, the exhaust sump may also function as an integrated local heat exchanger.

FIG. 1 shows an exhaust sump 22 of an electric machine in one embodiment of the invention. The heat removal may be accomplished by applying cooling fins 23 to the exhaust sump 22, which may provide additional cooling to the fluid prior to exiting the sump. In some embodiments, one or more external heat sinks may also be applied to the exterior surface of the exhaust sump. Alternatively, cooling fins and/or other features integral to the exhaust sump may cause the exterior of the exhaust sump to function as a heat sink. The cooling fins and/or heat sinks may have any configuration that may increase the surface area on the exterior surface of the exhaust sump and/or enhance thermal transfer from the exhaust sump. The cooling fins and/or heat sinks may be formed of a material with high thermal conductivity.

In some embodiments, heat may dissipate passively from the cooling fins and/or heat sinks. In other embodiments, a device, such as a fan, may be used to blow a gas over the surface of the cooling fins and/or heat sinks to aid in active cooling. In other embodiments, another fluid may flow over the surface of the cooling fins and/or heat sinks, over any exterior surface of the exhaust sump, or through any part of the exhaust sump, whether that fluid has a gaseous or liquid form. The other fluid may be actively passed over the cooling surfaces, whether it be with the aid of a fan, pump, compressor, or any other device generating a pressure differential, or any other active cooling mechanism. The other fluid may be channeled as part of a local heat exchanger and/or as part of another remote heat transfer system. Depending on the type of fluids, the exhaust sump may function as a gas-to-gas heat exchanger, liquid-to-gas heat exchanger, gas-to-liquid heat exchanger, liquid-to-liquid heat exchanger, or any other type or configuration of heat exchanger.

In accordance with some embodiments of the invention, the exhaust sump may have an outlet port 46, as shown in FIG. 1. In other embodiments, multiple outlet ports may be provided. Alternatively, no outlet ports may be provided and the fluid may be recirculated within the electric machine. The exhaust sump may be shaped to funnel the fluid toward one or more outlet. For example, the bottom surface of the sump may be sloped to allow fluid to drain toward the outlet. The fluid may exit the outlet, driven by gravitational forces, pressure differentials, centrifugal forces, or any other forces.

Because the exhaust sump 22 may act to collect a volume of cooling fluid (especially if a liquid coolant is used), there may be a time delay between the time the fluid enters the sump 22 and the time the fluid exits the sump 22. In some instances, the sump may act a fluid reservoir, such that a volume of fluid may be collected within the sump prior to exiting the sump. The level of fluid in the system may be adjusted such that a volume of fluid may consistently exist or be collected within the sump. Fluid may enter the sump at any rate and may exit the sump at any rate, such that fluid may enter and exit the sump at substantially the same or different rates. In some instances, fluid may exit the sump continuously, while in other instances, fluid may collect within the sump for a period of time and then exit at various rates or intervals. Thus, the fluid that may be collected within the exhaust sump may be cooled prior to exiting the exhaust sump.

In some embodiments, the time that the fluid may be collected within the exhaust sump may be used to pre-cool the fluid prior to being pumped out to the rest of the heat transfer system, such as shown in FIG. 4. FIG. 4 shows an electric machine 24 that may include an exhaust sump in fluid communication with a recirculation pump 25. The pre-cooling of the fluid within the exhaust sump may advantageously reduce the operating temperature requirements of a recirculation pump in a fluid circulation system for an electric machine. In other embodiments, the fluid may be removed from the electric machine and need not be recirculated. Still in other embodiments, the fluid may be recirculated within the electric machine and need not be removed from the machine.

VI. Overall Fluid Circulation System

FIG. 4 shows a conceptual schematic of system that may be used to circulate fluid through an electric machine 24, in accordance with an embodiment of the invention. An electric machine 24 may be provided such that it is in fluid communication with a pump 25. The pump may be in fluid communication with a one-way check valve 19, which may be in fluid communication with a filter 26, which may be in fluid communication with a heat exchanger 27. The heat exchanger 27 may be in fluid communication with the electric machine 24 to complete the fluid flow circuit. Alternately, the pump may be in fluid communication with a one-way check valve 19, which may be in fluid communication with a heat exchanger 27, which may be in fluid communication with a filter 26. The filter 26 may be in fluid communication with the electric machine 24 to complete to fluid flow circuit. In other alternate embodiments, the components of the fluid circulation system may be arranged in any order in the fluid flow circuit. Furthermore, a plurality of one or more of the components may be included in the circuit, and/or one or more of the components may be eliminated from the circuit.

In accordance with an embodiment as shown in FIG. 4, a fluid may enter an electric machine 24 through an inlet, and exit the electric machine 24 through an outlet. The fluid that has exited the electric machine may pass through a pump 25, which may drive fluid flow. The fluid may pass through a one-way check valve 19, which may allow fluid to flow through the device in only one direction and may prevent fluid from flowing in the reverse direction and back into the electric machine. The fluid may pass through a filter 26 before passing through a heat exchanger 27. The heat exchanger 27 may preferably transfer heat from the fluid, such that the fluid is at lower temperature when exiting the heat exchanger. From the heat exchanger 27, the fluid may enter the inlet of the electric machine 24. Thus, the fluid may be recirculated within the system, driven by a recirculation pump. The fluid may be used to cool and/or lubricate the electric machine, and may be heated while in the electric machine. The fluid may be cooled outside the electric machine via an external heat exchanger, and may thus be cooled before re-entering the electric machine.

The pump 25 may be any type of pump known in the art that may cause a desired amount of fluid to circulate through the system at a desired rate, or that may comprise any other desired characteristics. For example, the pump may be a centrifugal, diaphragm, gear, vane, impeller, flexible liner, injection, piston, progressing cavity, peristaltic, or lobe pump, or any other type or configuration of pump. Furthermore, the pump may be positioned remotely from, attached to, or contained within the machine. The pump may be a device that is separate from or integral to the electric machine, and may be powered by any source, which may be separate from or the same as the machine, and/or the pump may derive power from the machine.

The external heat exchanger 27 may be a liquid-to-liquid, gas-to-gas, or liquid-to-gas heat exchanger, or any other type of heat exchanger known in the art. For example, a fluid may enter the heat exchanger and may transfer heat to another fluid. The other fluid may be a gas or a liquid. A heat exchanger may have any form or configuration known in the art. In some instances, a heat exchanger may have a plate-type configuration. Alternatively, the heat exchanger may have a shell and tube type configuration.

The purpose of the heat exchanger may be to extract heat from the machine cooling fluid, so as to ultimately transfer the heat to the ambient air or other fluid. The removal of heat from the machine cooling fluid may provide for lower machine operating temperature, and thus may improve machine reliability. Additionally, lower operating temperature of the machine may result in lower electrical resistance values for the stator and rotor conducting materials. This may effectively reduce resistive losses in the machine, which may translate into improved machine efficiency.

A. Recirculation Pump Circuit, with Machine Housing as Thermal Expansion Chamber, Plenum, and Fluid Reservoir FIG. 4 shows that, in one embodiment of the invention, a recirculation pump 25 may transfer fluid from the fluid outlet of an electric machine 24, through a check valve 19, through a filter device 26, through a heat exchanger 27, and then to the fluid inlet of the electric machine 24. The recirculation pump may drive the fluid flow within the system. In some instances, the recirculation pump may be controlled to vary the speed of fluid flow. For example, the speed of fluid flow may be increased, decreased, or maintained by controlling the recirculation pump. Thus, the fluid flow speed may be varied and/or maintained based on the controllable recirculation pump. The speed of the fluid flow may affect the rate of heat transfer provided to the electric machine. In this recirculating heat transfer circuit, the machine housing 4, as shown in FIG. 1, may act as a thermal expansion chamber, plenum, and/or reservoir for the recirculating fluid.

FIG. 1 shows an electric machine in accordance with an embodiment of the invention. Electric machines containing fluid may typically be configured either as an open circuit (open to the atmosphere) or as a closed circuit (closed to the atmosphere) in a fluid circulation system. The closed circuit machine configuration typically may require a separate expansion chamber to prevent fluid leakage from the system due to thermal expansion of the circulating fluid.

A partially fluid filled machine, in accordance with an embodiment of the invention, may allow the machine housing 4 to function as a thermal expansion chamber and the main internal cavity 37 of the machine housing 4 to act as a plenum, with one or more pressure equalization features added to the machine. The pressure equalization features may include a pressure equalization device 28, as described in greater detail below. This method may allow for the use of a closed circuit fluid circulation system, without the need for external expansion chambers or fluid reservoirs. When pressure increases or decreases within the machine housing 4, the use of a pressure equalization device may allow pressure equalization within the machine and fluid circulation system, and may thus aid in preventing fluid leakage from the system.

As the system temperature rises, the fluid within the machine may increase in temperature and expand, causing an increase in pressure within the machine. To equalize the pressure within the machine, the machine housing may include a pressure equalization device 28, such as a valve, piston, sintered metal vent, or expandable bladder. The pressure equalization device may allow the machine housing to function as a thermal expansion chamber and plenum, equalizing the pressure within the fluid-sealed machine with the external ambient pressure, as the temperature of the fluid within the machine changes. The pressure equalization may keep the pressure within the machine housing within a predetermined range. In some embodiments, the predetermined range may be any pressure less than or equal to and/or greater than or equal to one or more threshold pressures. In some instances, a threshold pressure may be an ambient pressure. Thus, a pressure equalization device 28 may be provided on the electric machine 24 to allow for pressure equalization, while still maintaining the integrity of the fluid-sealed enclosure. One or more pressure equalization devices may be located, preferably, anywhere on the machine housing that properly facilitates this pressure equalization.

A partially fluid filled machine, in accordance with an embodiment of the invention, may allow the machine housing to function as the fluid reservoir. In some embodiments, the electric machine may have one or more fluid level devices 48 that may allow a user or inspector to determine the level of fluid inside the machine housing. The fluid level device may be any type of physical, mechanical, electrical, electronic, optical, pneumatic, ultrasonic, or radio frequency device, or any combination thereof, or any other type or configuration of sensing, measuring, or indicating device known in the art or later developed, such that the device may provide feedback to the user or inspector regarding the level of fluid within the machine.

In some embodiments, the electric machine may have one or more transparent windows that may provide visual feedback regarding the level of fluid within the machine. The window may enable a user or inspector to view within the electric machine and determine the fluid level inside. The window may be formed of a transparent material and may still allow the electric machine housing to maintain a fluid-sealed machine enclosure. The window may be any shape or size and may enable a user or inspector to determine the fluid level, or range of fluid levels, within the machine. One or more windows may be placed on one or more sides of the electric machine at a location consistent with determining the desired fluid level within the machine housing. One or more windows may also be placed on or near the exhaust sump to view the fluid level within the exhaust sump, which may also function as part of the fluid reservoir.

B. Fluid-Sealed Machine Enclosure

FIG. 6 shows a fluid-sealed machine enclosure in accordance with an embodiment of the invention. To implement the fluid injection system, a machine housing 4 may be a sealed enclosure, in which the housing features are sealed at all joints and junctions to prevent leakage of internal fluids from the machine. Use of a fluid-sealed construction may typically not be needed for conventional machines, but may be an important feature for the fluid injected machine design.

Seals may be introduced between a removable end bell 38 and housing 4, between dielectric insulators 39 for power contacts and the endbell 38, between power contacts 40 and the dielectric insulators 39, and between a rotating machine shaft 11 and the endbell 38 and housing 4.

The mounting hardware for fluid injector nozzles 9 may be accessed and installed from the outside of the machine, so therefore seals may also be implemented at locations 47 between the injector nozzles and machine housing 4 and endbell 38, to inhibit fluid from flowing to the injector nozzle mounting hardware locations and to prevent fluid leakage through the hardware interfaces. The fluid injector mounting hardware may be installed from the outside of the machine to prevent damage to the rotating components within the machine in the case of a fastener coming loose. In this embodiment of the design, if a fastener disengages, it may always be on the outside of the machine, away from the internal rotating components.

The sealed housing 4 may accommodate thermal expansion of the internal fluid, due to temperature changes. A method of pressure equalization may be used to prevent pressure inside of the machine from becoming excessive due to fluid thermal expansion. The sealed housing design may incorporate a pressure equalization device 28, which may allow for pressure equalization and may prevent fluid leakage from the machine due to increased pressure. The lower pressure may be less demanding on the shaft seal 13 and may allow for the use of a cost-effective, lower sealing pressure, standard shaft seal.

To simplify the interface to the fluid flow circuit, the sealed housing may feature a fluid distribution manifold 42 and exhaust sump 22, as shown in FIG. 1, where a single fluid inlet 41 to the machine and a single fluid outlet 46 from the machine may be achieved. Alternatively, any number of fluid inlets or outlets may be provided. The manifold 42 may allow for a single fluid inlet connection, with an internal plenum, which may distribute the fluid to one or more fluid flow passages within the machine. Similarly, the exhaust sump 22 may be used to collect the fluid exiting the fluid flow passages within the machine through exhaust passages 20 and 21. The exhaust sump 22 may provide for the collection of a volume of fluid within the sump, prior to exiting the machine through a single outlet port 46.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. An electric machine comprising:
   a rotor fixed to a rotatable shaft and supported by means of one or more bearings;
   a stator stationary in relation to the rotatable rotor and shaft with a gap between the rotor and the stator;
   a housing surrounding all or part of the machine; and
   one or more stator fluid flow pathways between the stator and the housing, wherein the stator fluid flow pathway comprises one or more fluid flow passages which allow a fluid to directly contact an outside surface of the stator along the length of the stator fluid flow pathway from a fluid inlet of the machine to a fluid outlet of the machine.

2. The electric machine of claim 1 wherein the stator fluid flow pathway comprises one or more circumferential grooves on the internal surface of the housing around the perimeter of the internal surface of the housing, wherein the one or more grooves form one or more cavities between an outside surface of the stator and an inside surface of the housing.

3. The electric machine of claim 2 wherein a fluid is directed to flow circumferentially around the perimeter of the stator through the one or more cavities between the outside surface of the stator and the inside surface of the housing.

4. The electric machine of claim 3 wherein the fluid directly contacts the outside surface of the stator.

5. The electric machine of claim 1 wherein the stator fluid flow pathway comprises one or more grooves or other surface features on the internal surface of the housing or the outside surface of the stator, wherein the one or more grooves or other surface features form one or more passages along the length of the stator between an outside surface of the stator and an inside surface of the housing.

6. The electric machine of claim 5 wherein a fluid is directed to flow along the length of the stator through the one or more passages between the outside surface of the stator and the inside surface of the housing.

7. The electric machine of claim 6 wherein the fluid directly contacts the outside surface of the stator.

8. The electric machine of claim 6 wherein the one or more passages allow the fluid to exit the passage at the edge of the stator.

9. The electric machine of claim 8 wherein the fluid that exits the one or more passages at the edge of the stator directly contacts an outside surface of the rotor.

10. The electric machine of claim 1 wherein the outside surface of the stator includes one or more features which direct fluid flow around or along the stator surface or which increase the surface area of the one or more fluid flow passages.

11. The electric machine of claim 1 wherein the inside surface of the housing includes one or more features which direct fluid flow around or along the stator surface or which increase the surface area of the one or more fluid flow passages.

12. The electric machine of claim 1 wherein all or part of the housing is fluid-sealed, such that fluid is prevented from entering or exiting the machine except at designated inlet and outlet ports.

13. A method for cooling an electric machine comprising:
    providing a rotor fixed to a rotatable shaft;
    providing a stator stationary in relation to the rotatable rotor and shaft with a gap between the rotor and the stator;
    providing a housing surrounding all or part of the machine;
    providing one or more stator fluid flow pathways between the stator and the housing, wherein the stator fluid flow pathway comprises one or more fluid flow passages which allow a fluid to directly contact an outside surface of the stator along the length of the stator fluid flow pathway from a fluid inlet of the machine to a fluid outlet of the machine; and
    flowing a fluid in the one or more passages between the stator and the housing, such that the fluid directly contacts the stator and allows heat to transfer from the stator to the fluid, thereby cooling the stator.

14. The method of claim 13 wherein the stator fluid flow pathway comprises providing one or more circumferential grooves on the internal surface of the housing around the perimeter of the internal surface of the housing, wherein the one or more grooves form one or more cavities between an outside surface of the stator and an inside surface of the housing.

15. The method of claim 14 further comprising flowing a fluid circumferentially around the perimeter of the stator through the one or more cavities between the outside surface of the stator and the inside surface of the housing.

16. The method of claim 13 wherein a stator fluid flow pathway comprises providing one or more grooves or other surface features on the internal surface of the housing or outside surface of the stator, wherein the one or more grooves or other surface features form one or more passages along the length of the stator between an outside surface of the stator and an inside surface of the housing.

17. The method of claim 16 further comprising flowing a fluid along the length of the stator through the one or more passages between the outside surface of the stator and the inside surface of the housing.

18. The method of claim 17 wherein the one or more passages allow the fluid to exit the passage at the edge of the stator.

19. The method of claim 18 wherein the fluid that exits the one or more passages at the edge of the stator directly contacts an outside surface of the rotor.

20. The method of claim 13 further comprising providing one or more features on the outside surface of the stator, wherein the one or more features direct fluid flow around or along the stator surface or increase the surface area of the one or more fluid flow passages.

21. The method of claim 13 further comprising providing one or more features on the inside surface of the housing, wherein the one or more features direct fluid flow around or along the stator surface or increase the surface area of the one or more fluid flow passages.

22. The method of claim 13 wherein all or part of the housing is fluid-sealed, such that fluid is prevented from entering or exiting the machine except at designated inlet and outlet ports.

* * * * *